June 23, 1936.  W. E. ROONEY  2,044,813
FISH CANNING MACHINE
Filed April 13, 1933  25 Sheets-Sheet 6

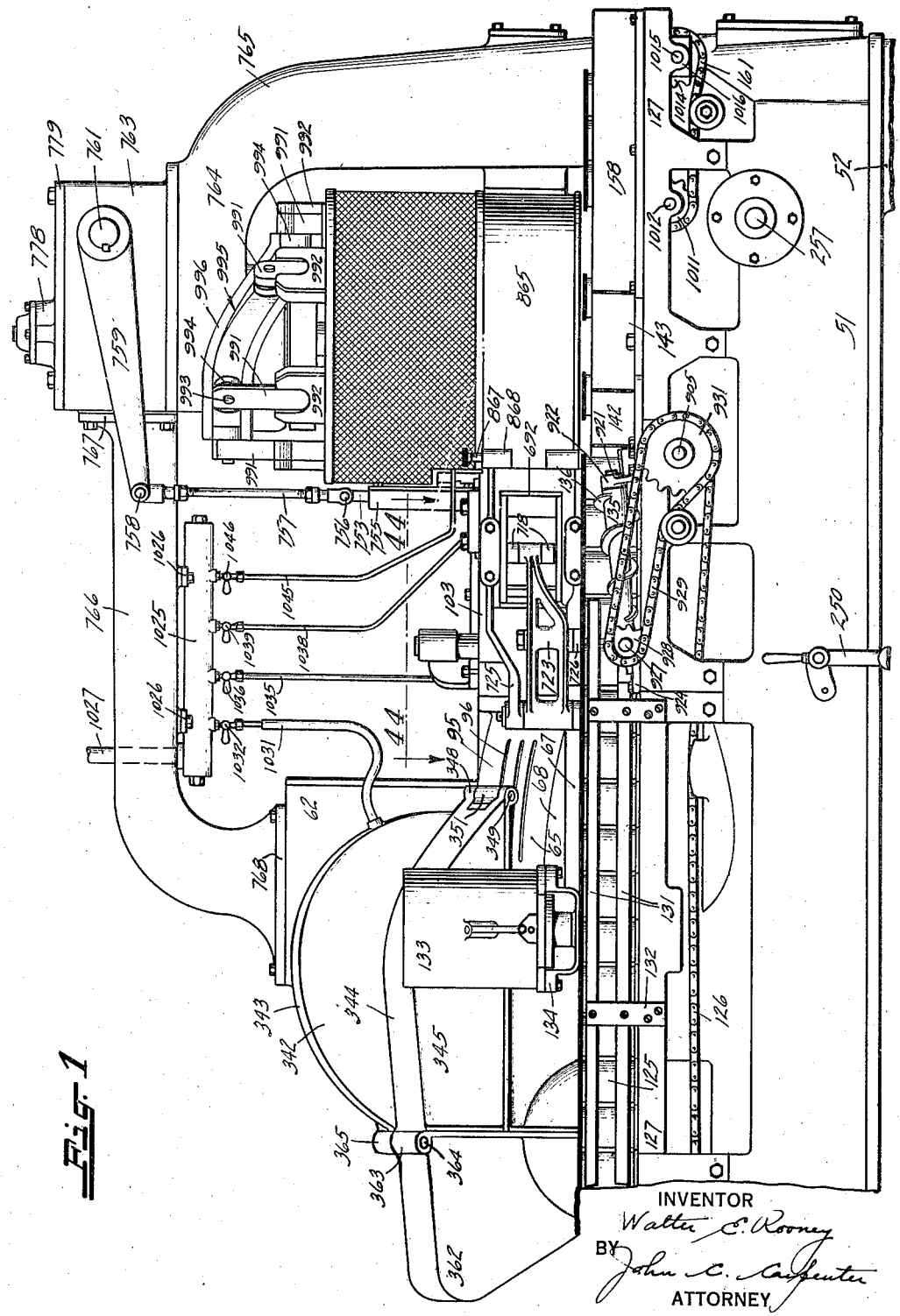

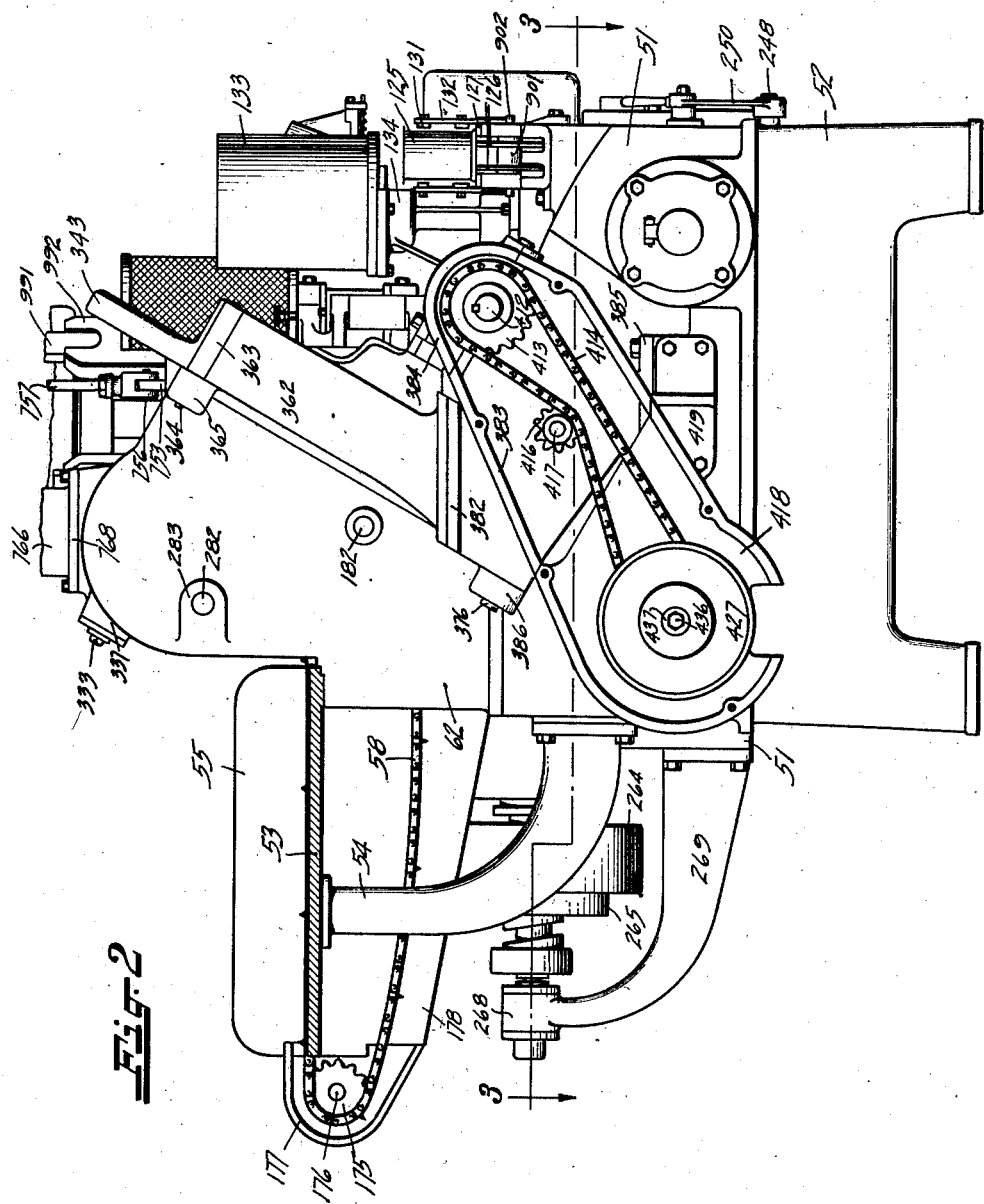

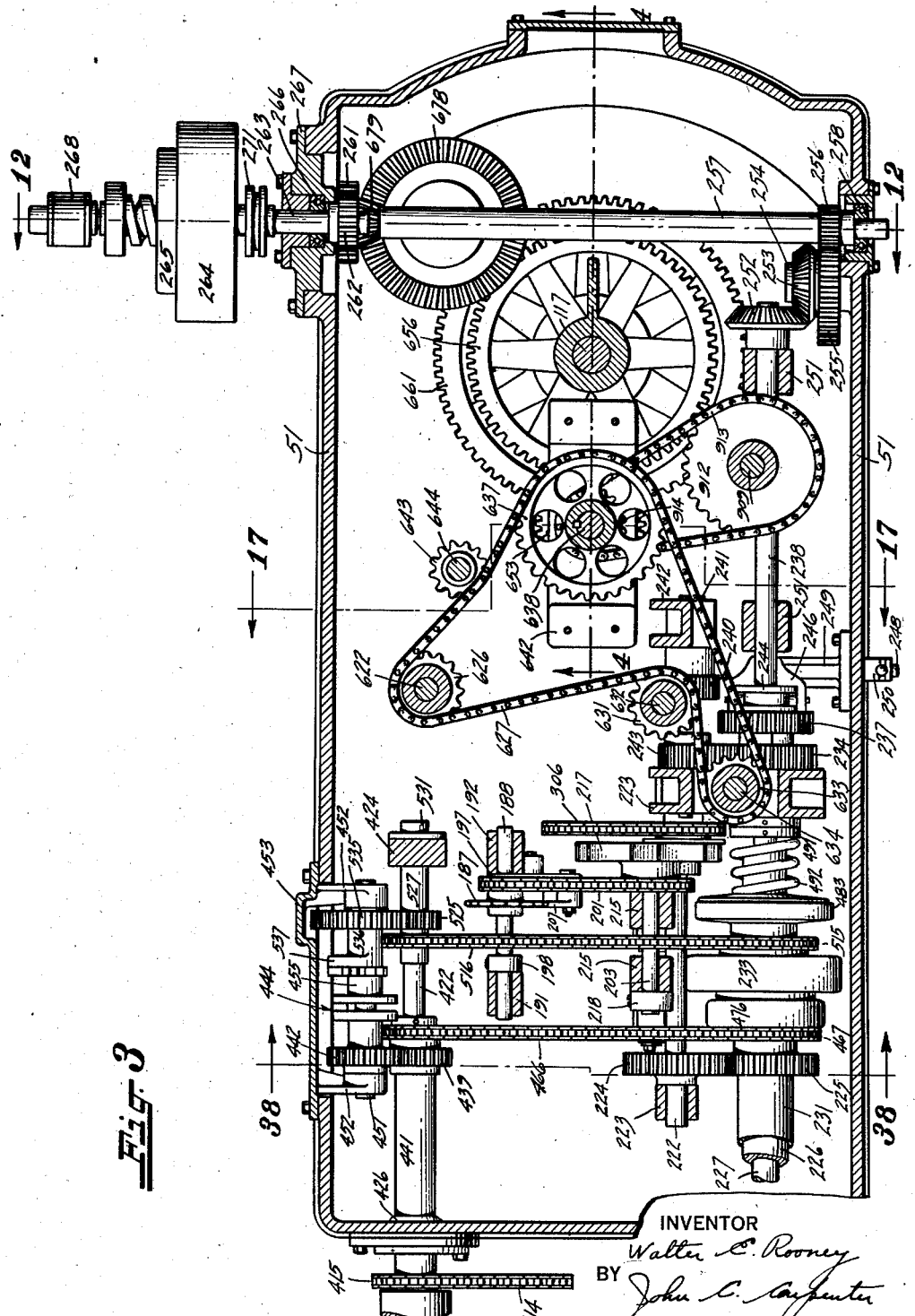

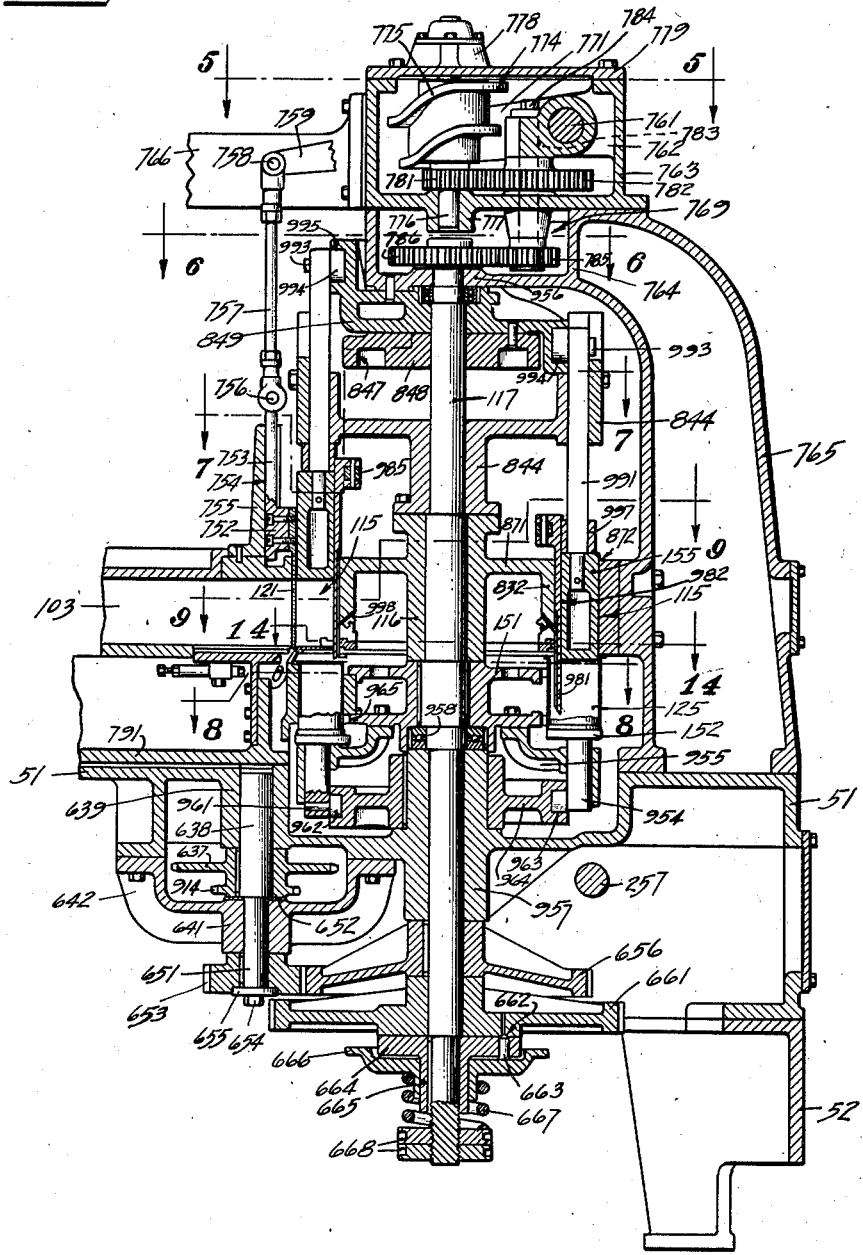

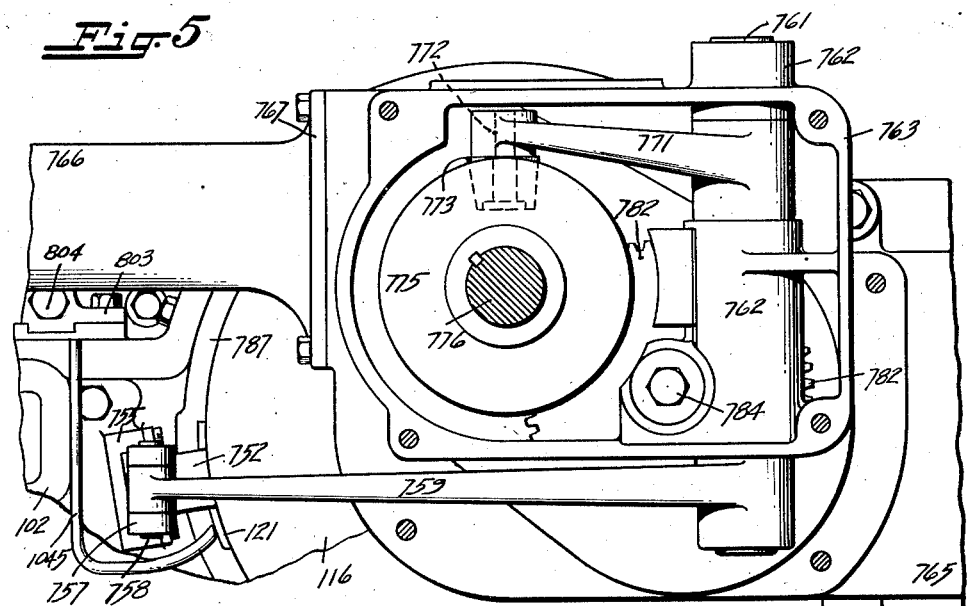
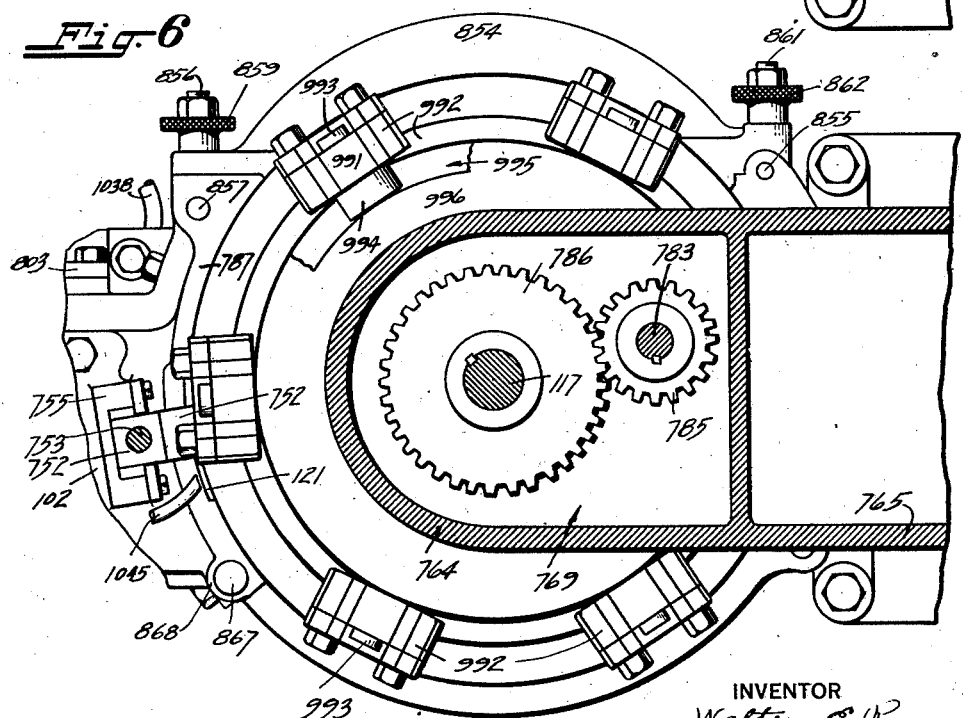

INVENTOR
Walter E. Rooney
BY John C. Carpenter
ATTORNEY

June 23, 1936.  W. E. ROONEY  2,044,813
FISH CANNING MACHINE
Filed April 13, 1933    25 Sheets-Sheet 7

INVENTOR
Walter E. Rooney
BY John C. Carpenter
ATTORNEY

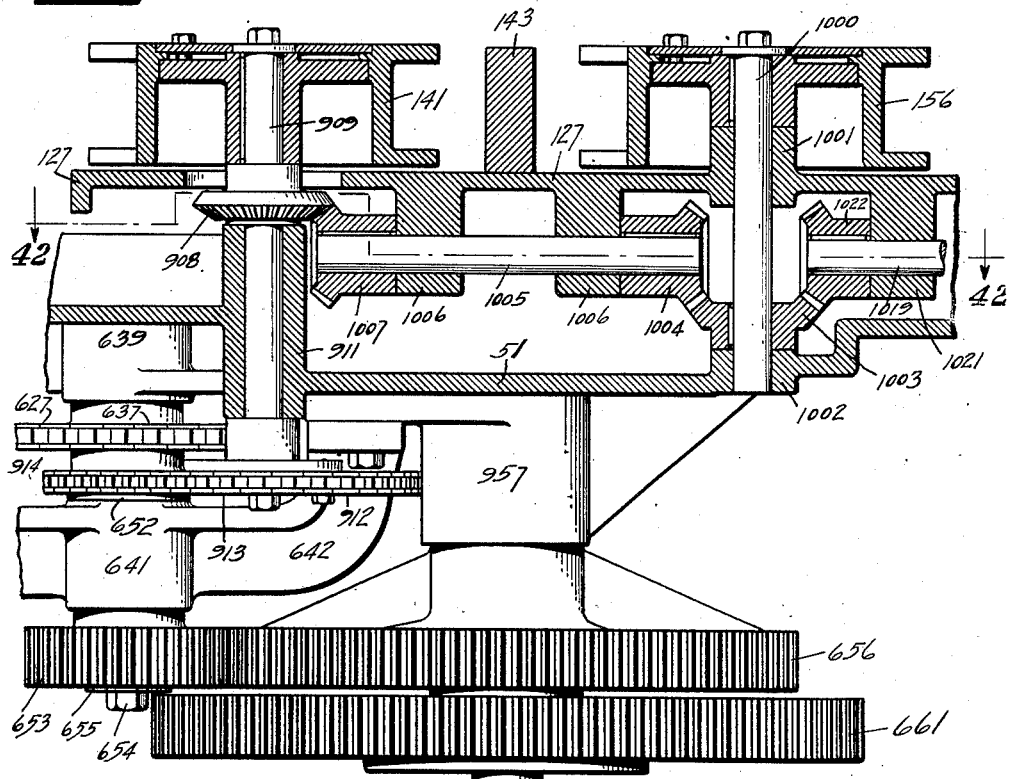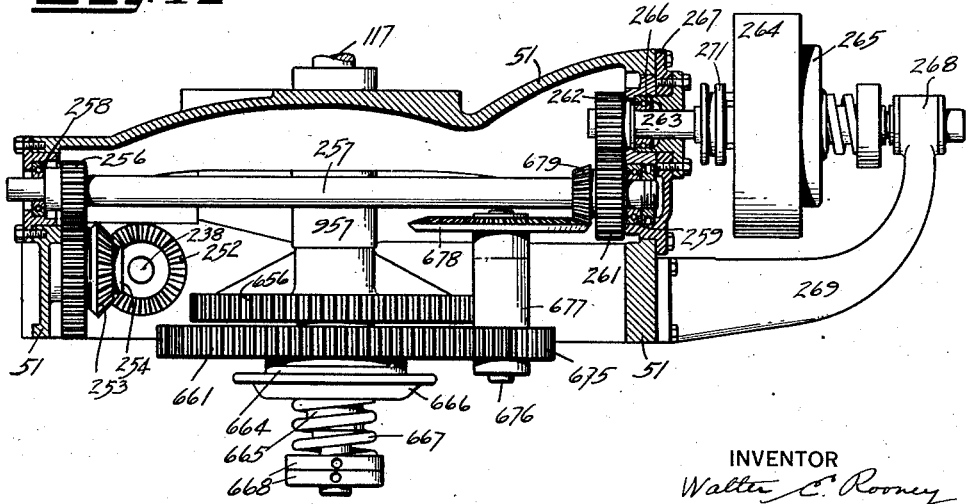

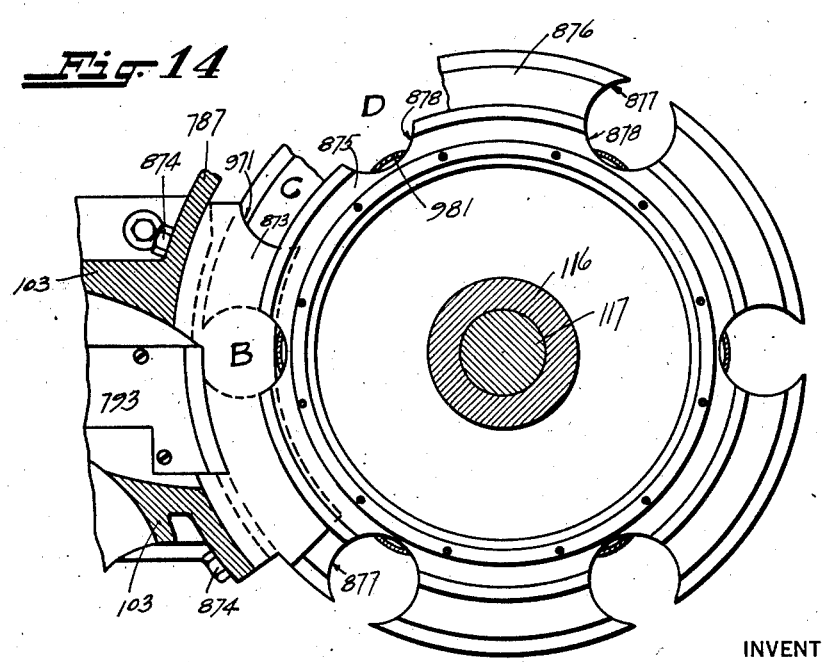

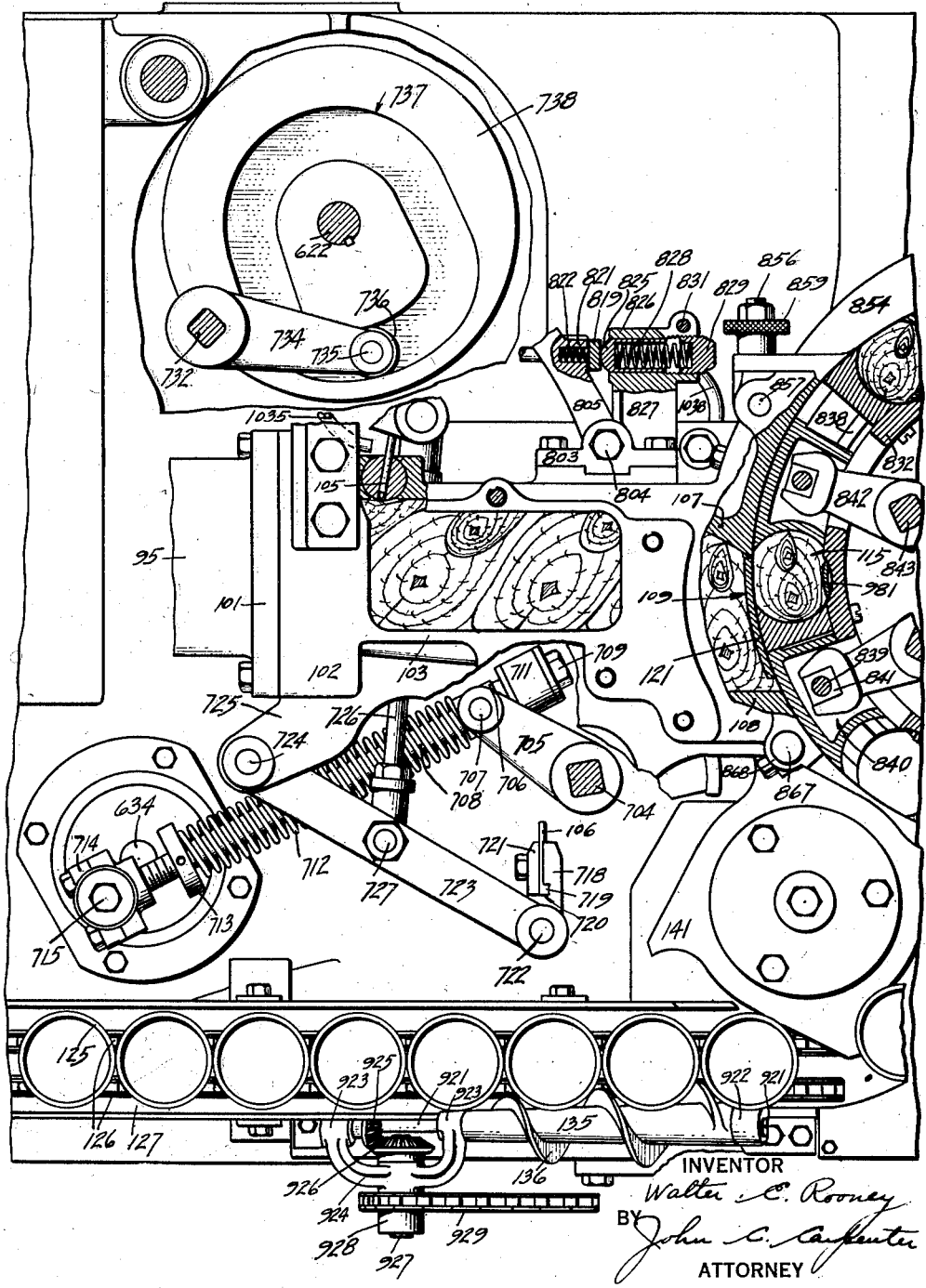

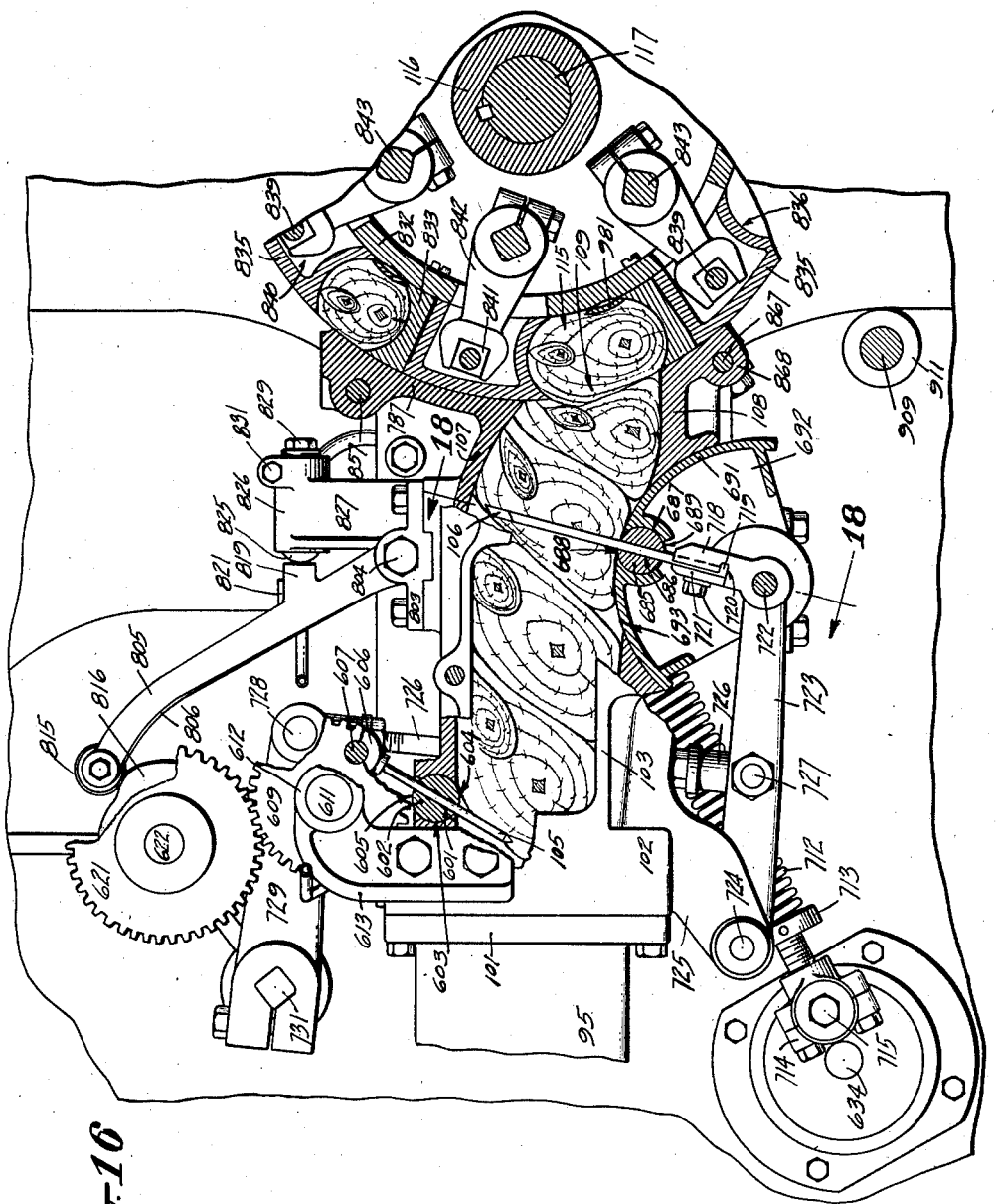

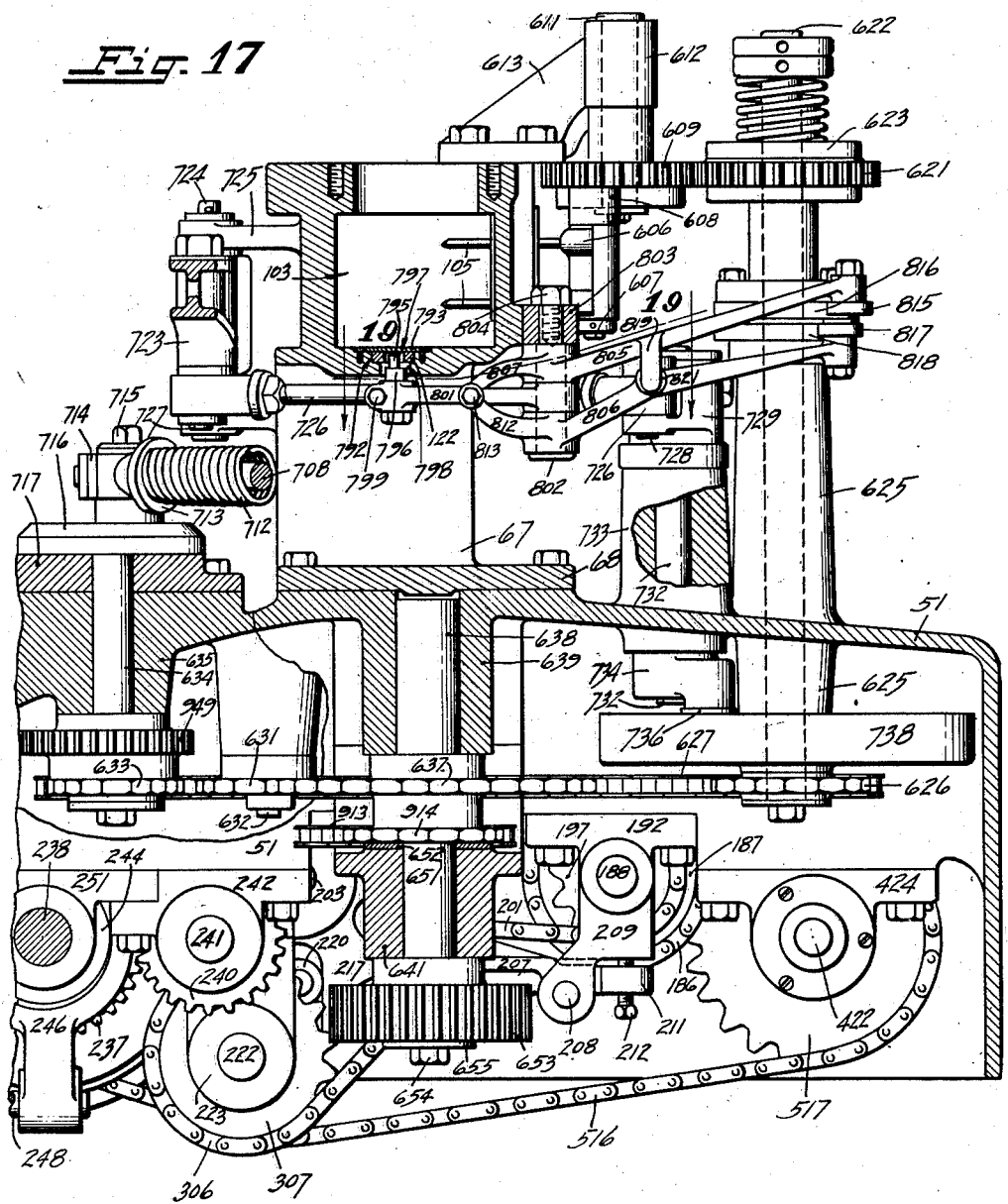

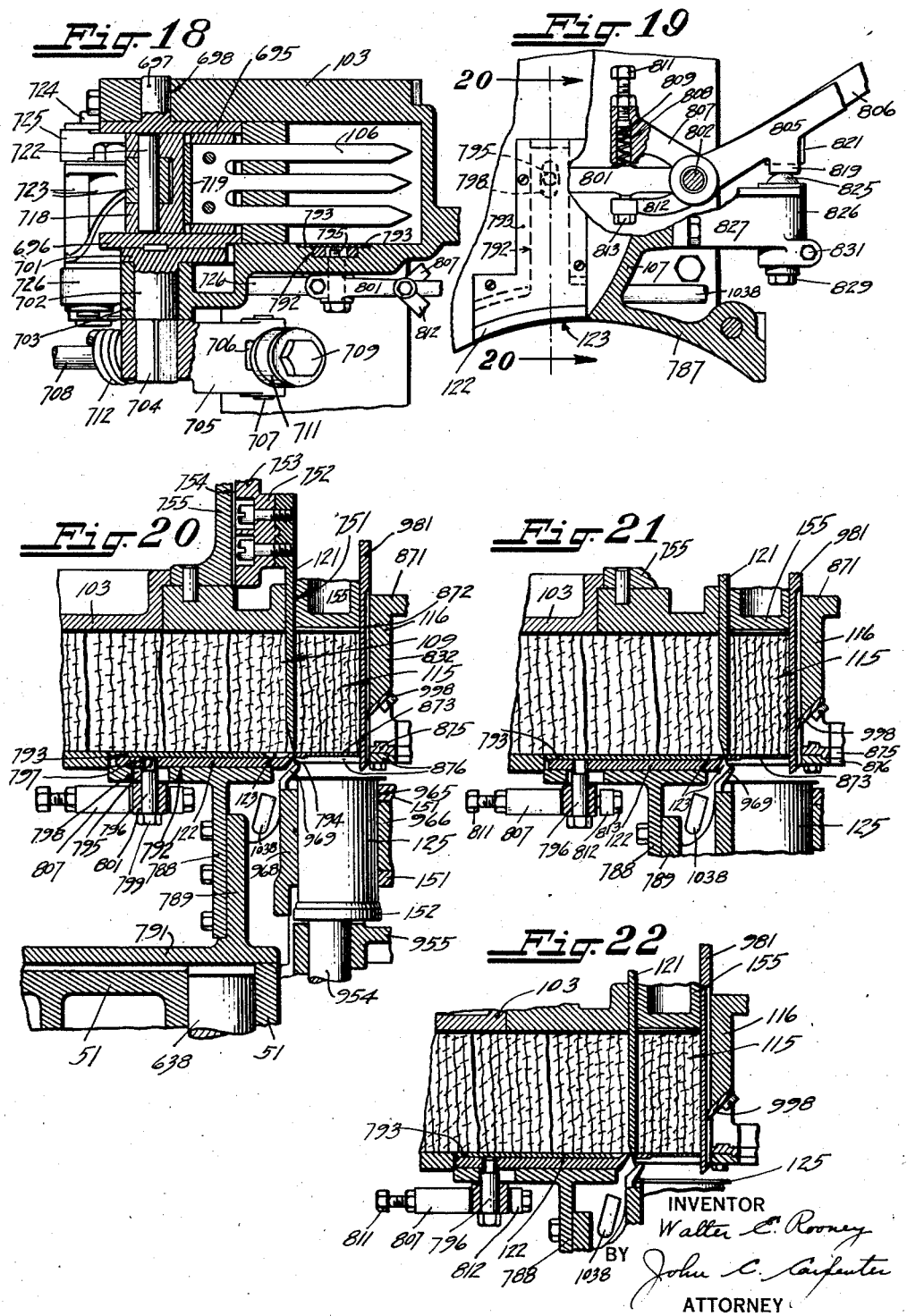

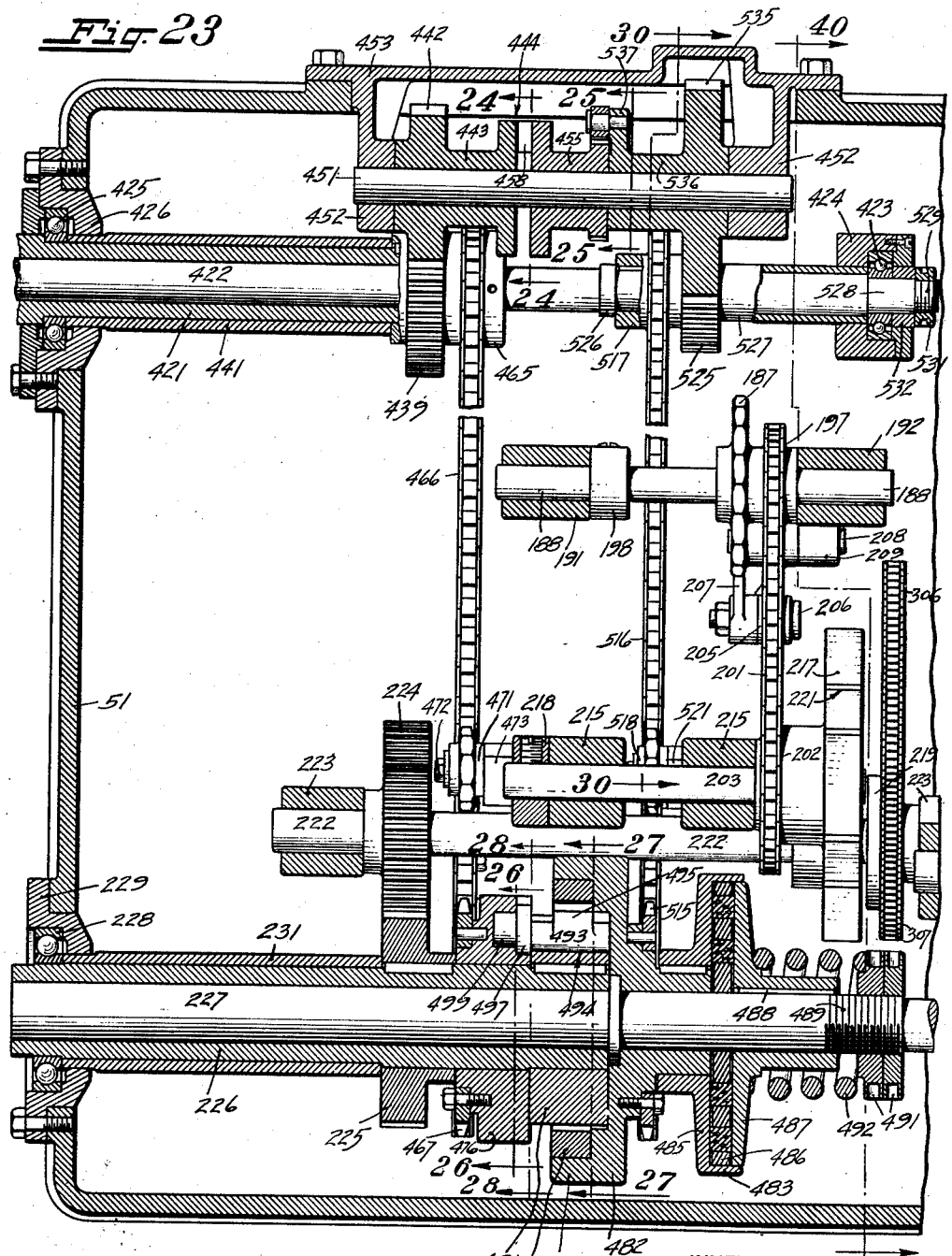

June 23, 1936.  W. E. ROONEY  2,044,813
FISH CANNING MACHINE
Filed April 13, 1933   25 Sheets-Sheet 15
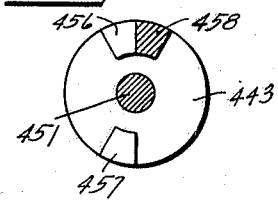
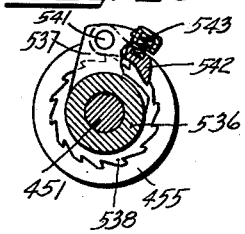
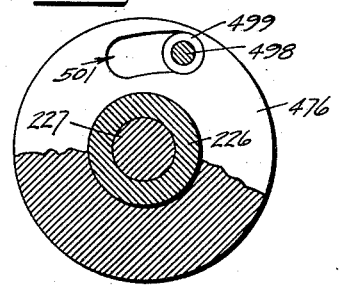
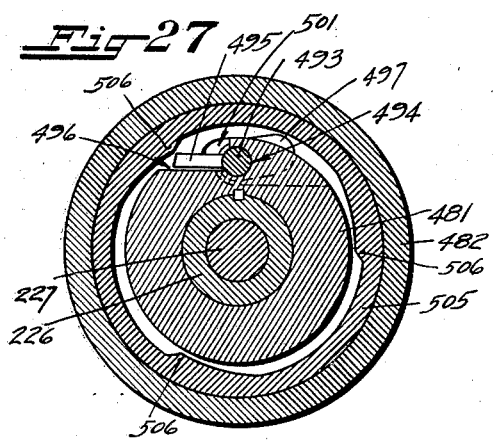
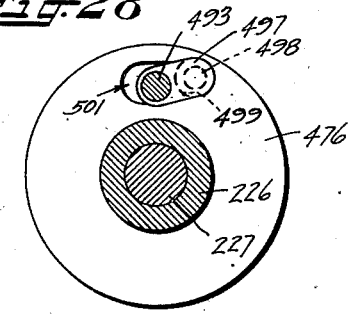
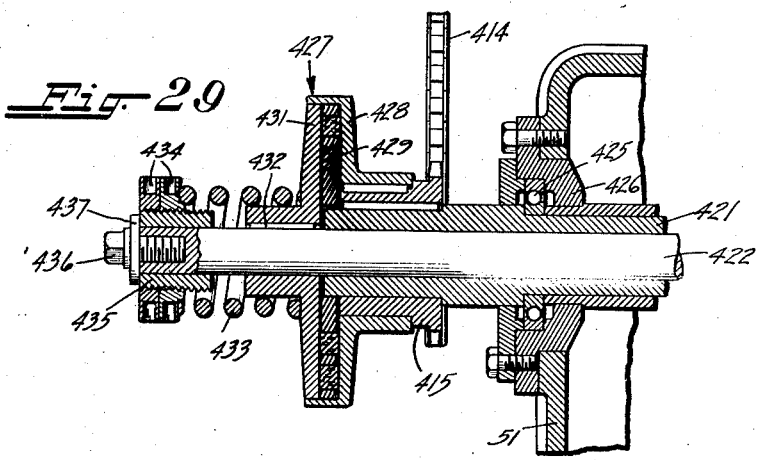
INVENTOR
Walter E. Rooney
BY John C. Carpenter
ATTORNEY

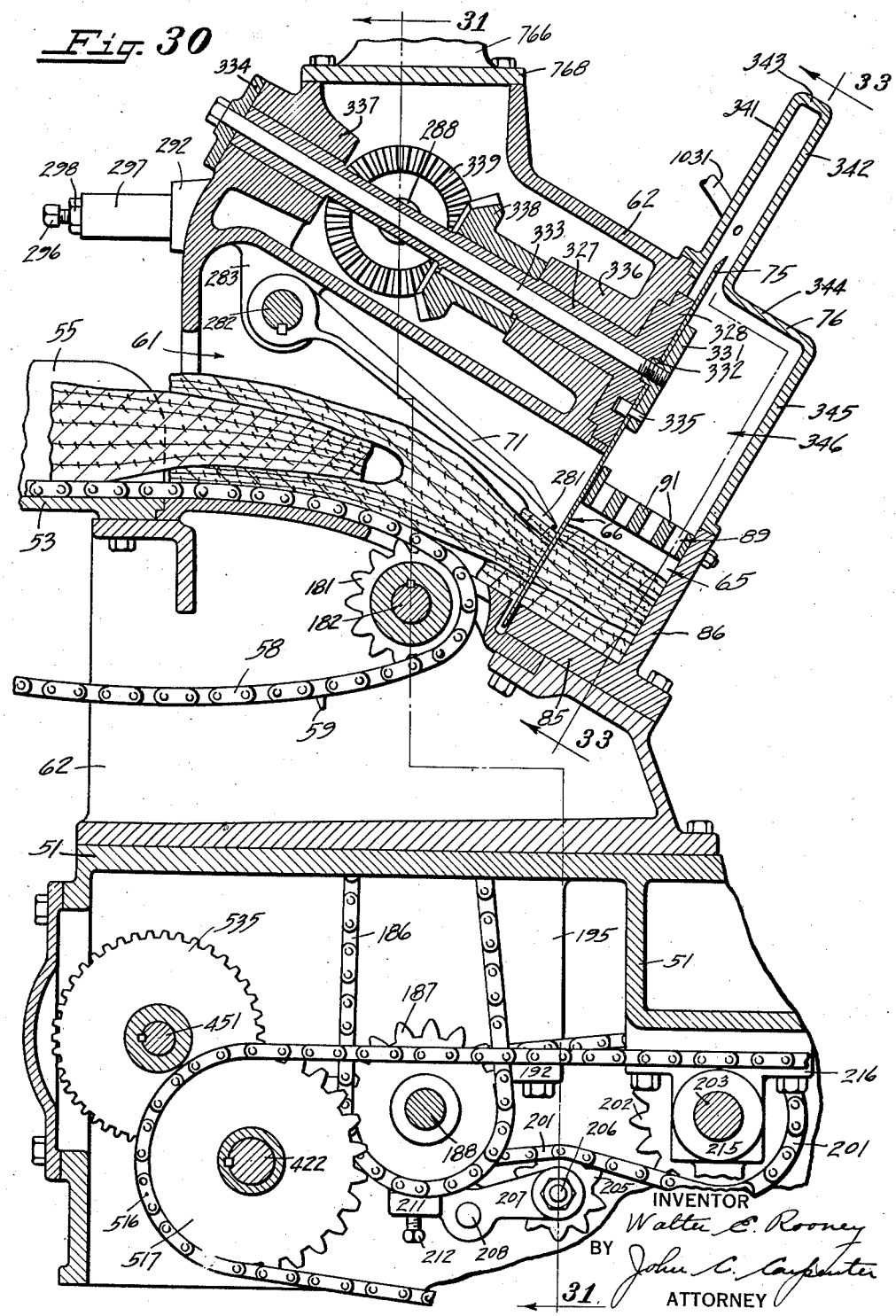

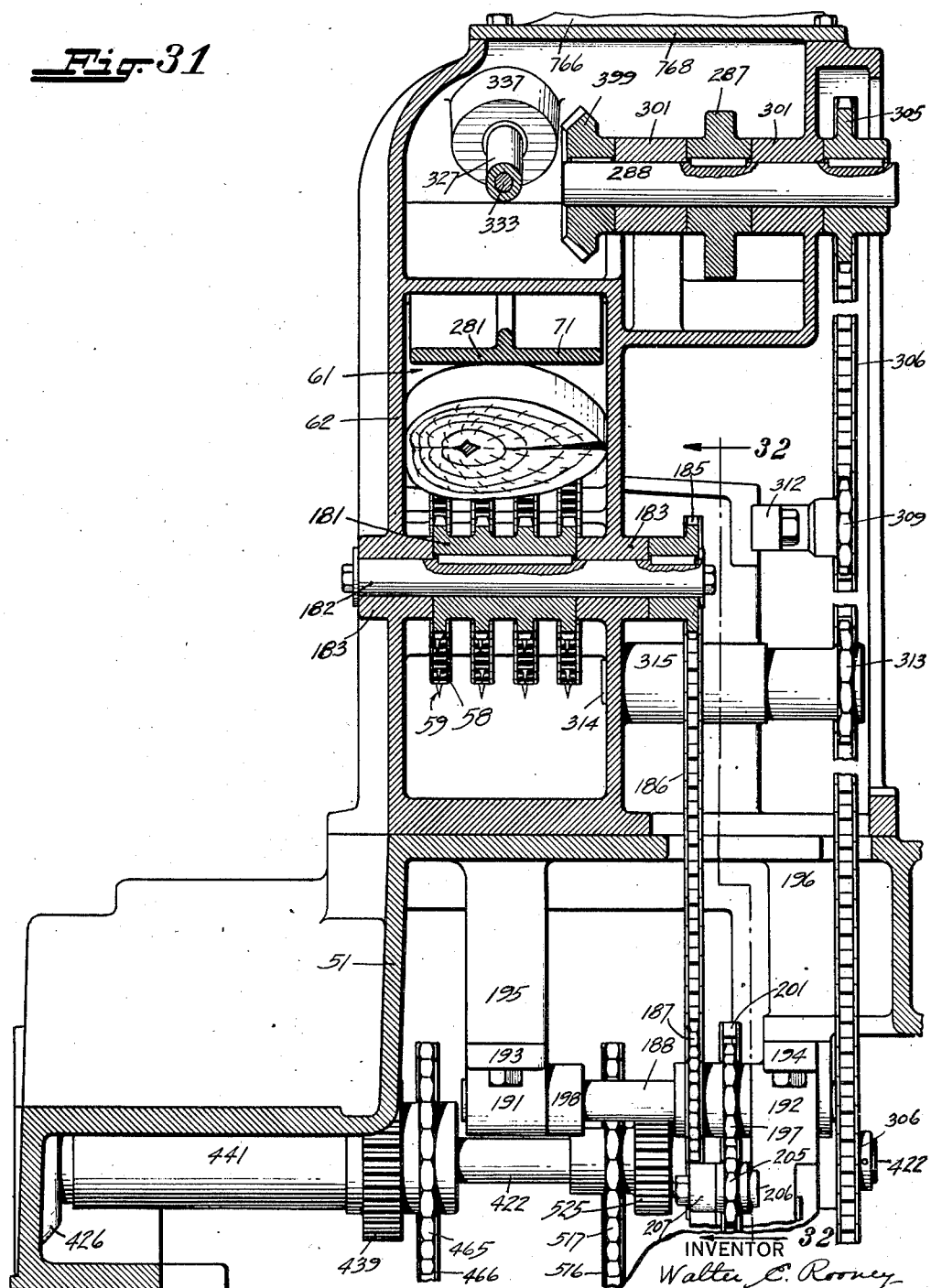

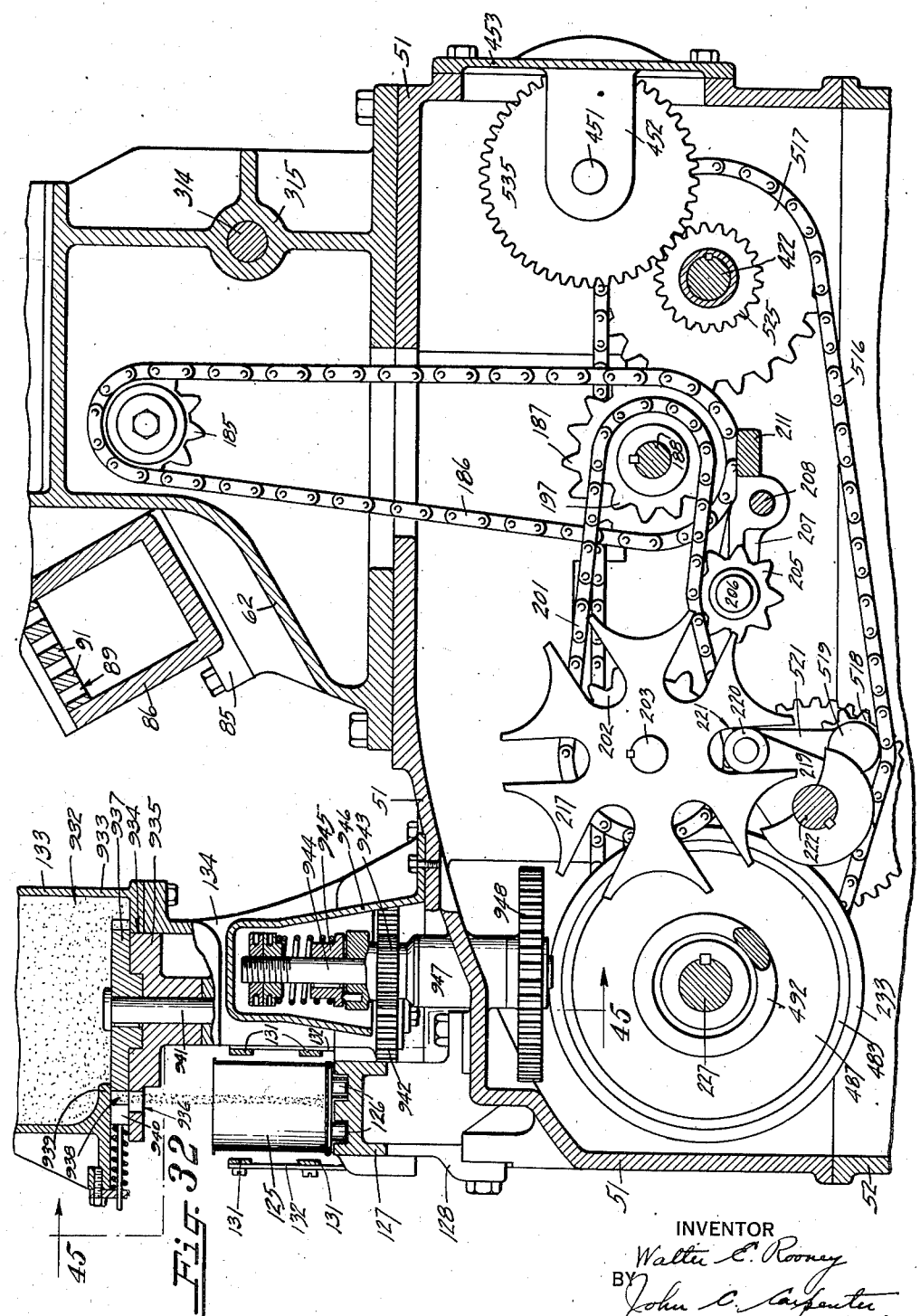

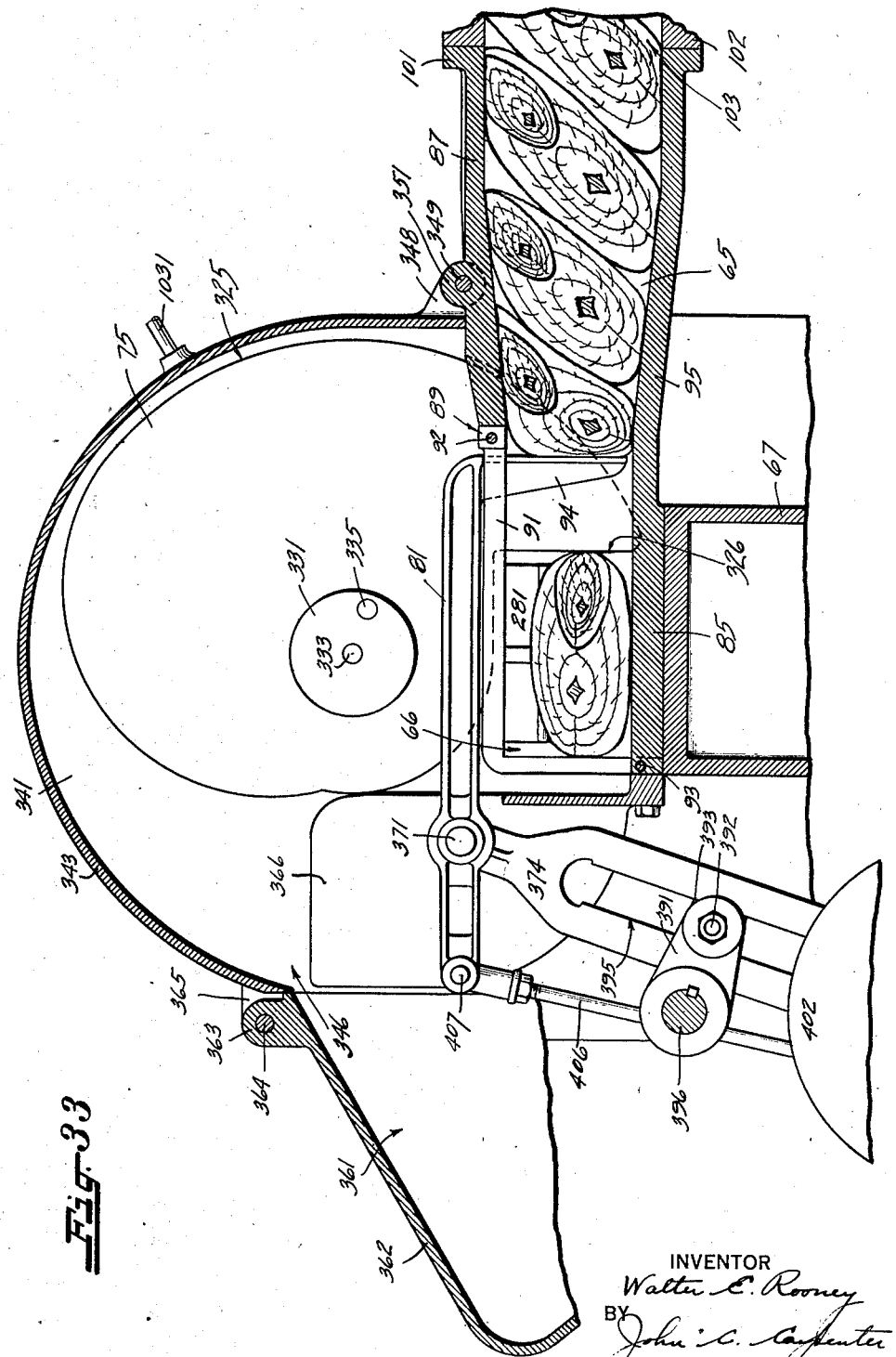

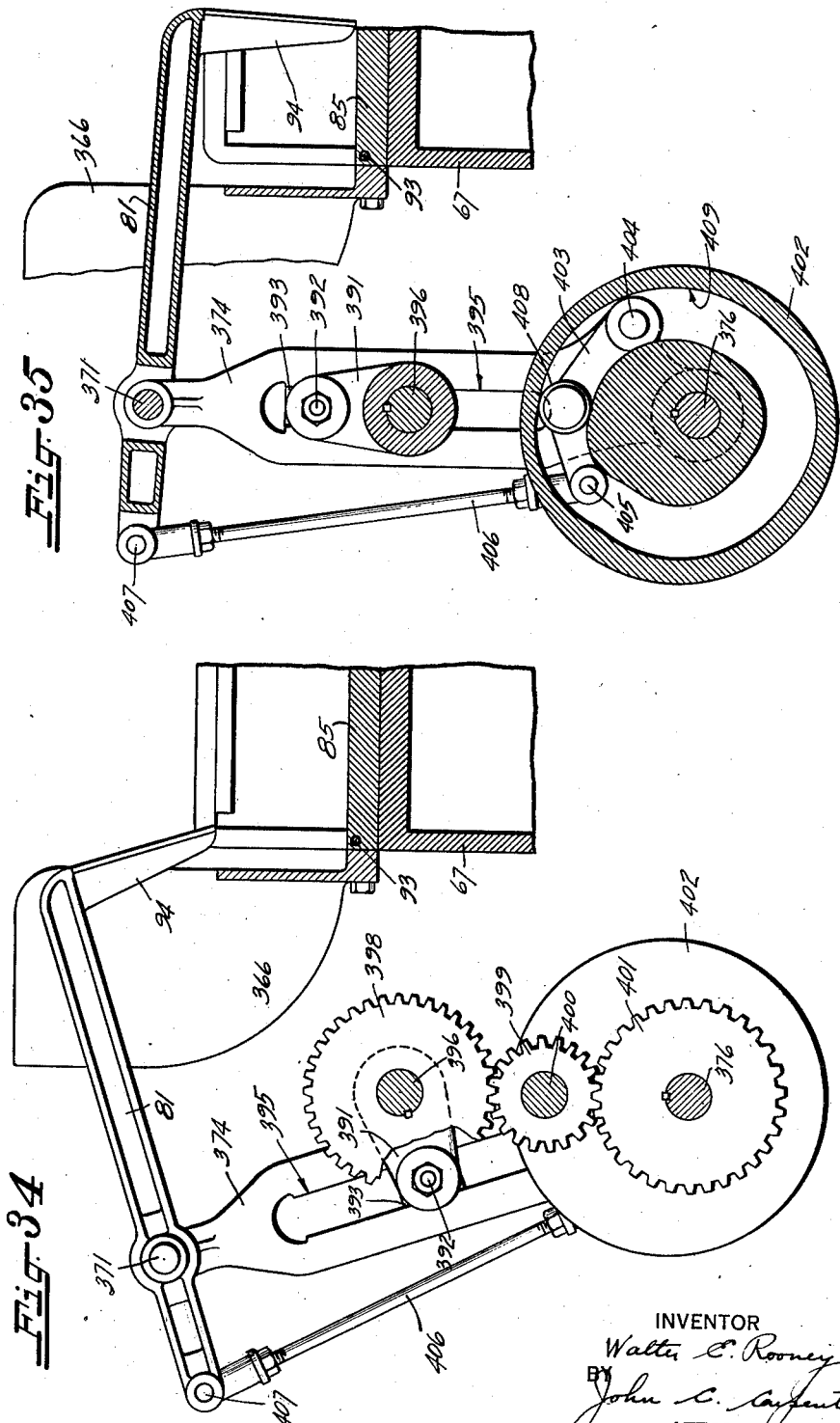

June 23, 1936. W. E. ROONEY 2,044,813
FISH CANNING MACHINE
Filed April 13, 1933 25 Sheets—Sheet 21

INVENTOR
Walter E. Rooney
BY
John C. Carpenter
ATTORNEY

June 23, 1936. W. E. ROONEY 2,044,813
FISH CANNING MACHINE
Filed April 13, 1933 25 Sheets-Sheet 22

INVENTOR
Walter E. Rooney
BY John C. Carpenter
ATTORNEY

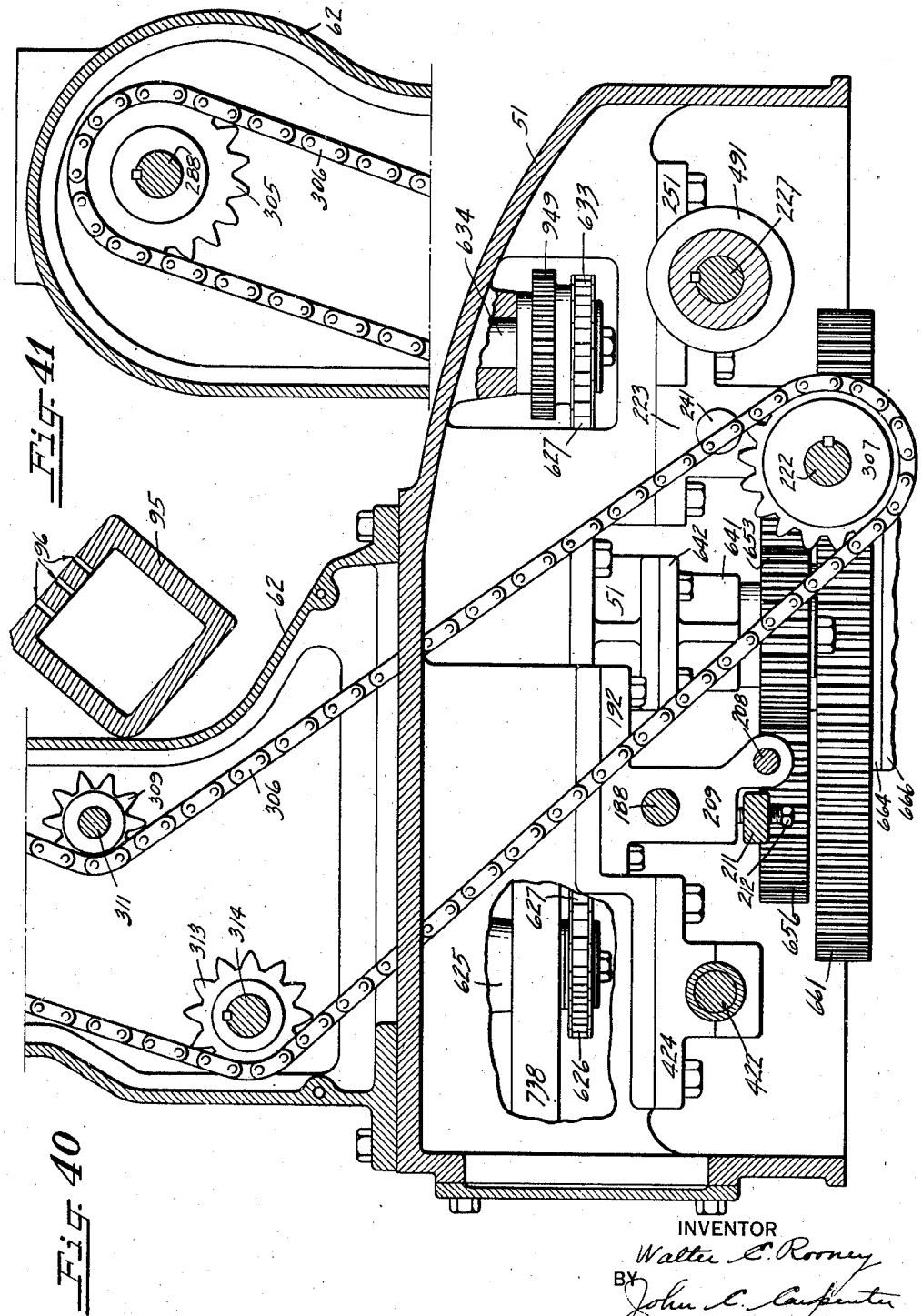

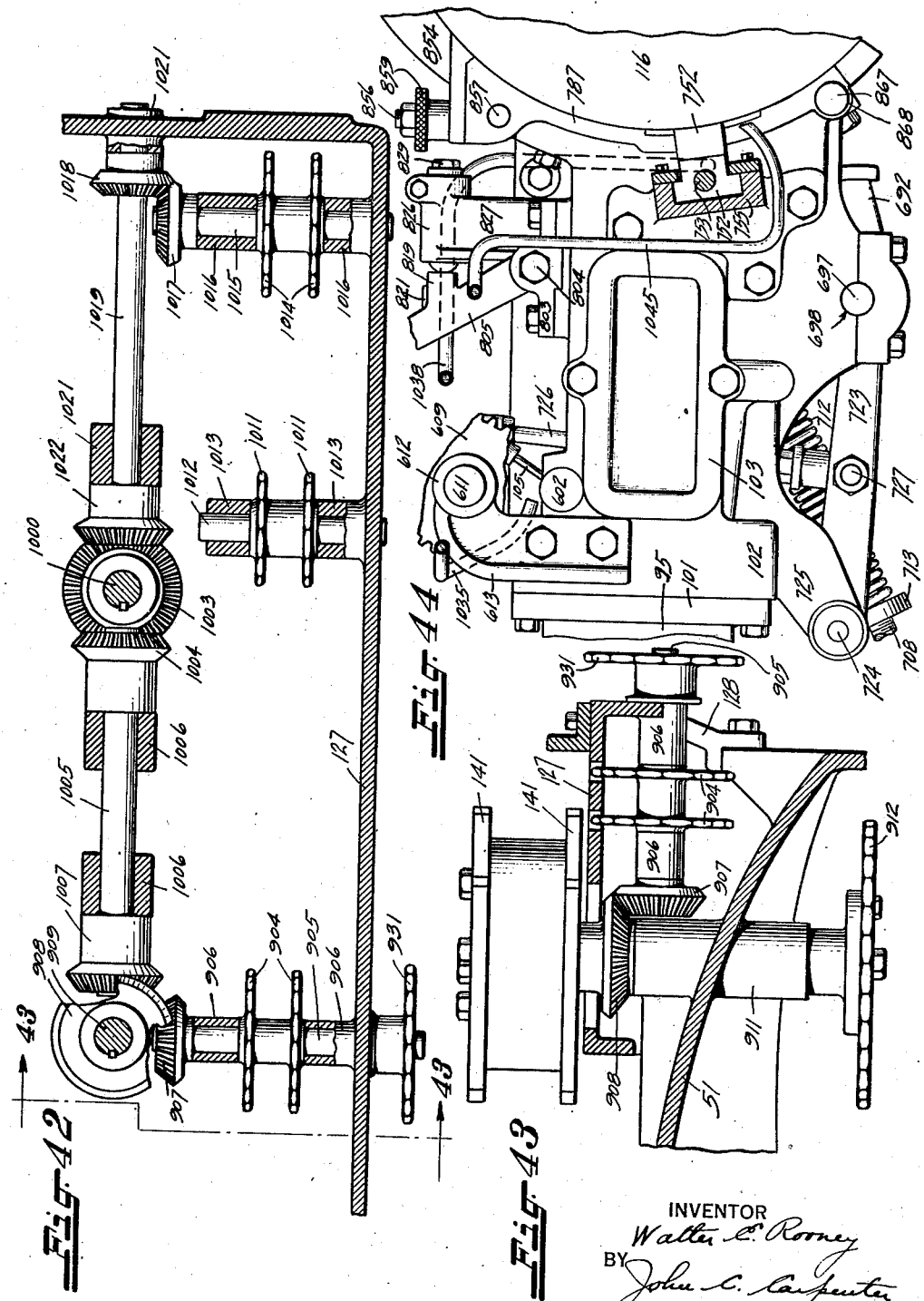

June 23, 1936.   W. E. ROONEY   2,044,813
FISH CANNING MACHINE
Filed April 13, 1933   25 Sheets-Sheet 25

INVENTOR
Walter E. Rooney.
BY John C. Carpenter
ATTORNEY

Patented June 23, 1936

2,044,813

UNITED STATES PATENT OFFICE 2,044,813

FISH CANNING MACHINE

Walter E. Rooney, Bellingham, Wash., assignor to American Can Company, New York, N. Y., a corporation of New Jersey Application April 13, 1933, Serial No. 665,950

29 Claims. (Cl. 226—101)

The present invention relates to fish canning machines and has particular reference to an automatic machine wherein whole fish are received and fed as a continuous, unbroken supply from which successive sections are cut off and crowded together into a fish mass of predetermined height and predetermined compactness and from which a definite quantity is segregated and shaped into a measured charge which is then introduced directly into a can.

The principal object of the invention is the provision of an apparatus for compressing a fish mass in a restraining tunnel with a pressure which cannot exceed a given amount so that a uniform quantity of fish may subsequently be filled into each can.

An important object of the invention is the provision of a fish condensing, compacting or compressing device which operates normally at a certain speed but which ceases to operate for a short period when the fish have been compressed an excessive amount or when a large piece of fish blocks the tunnel and thereby sets up a resistance against feeding equivalent to that in an excessive compression and one which then resumes operation at a slower speed if normal conditions are not restored following the rest period.

An important object of the invention is the provision of a fish compressing device for a can filling machine of the character described which has two compression movements, a normal speed movement and a slower movement, the latter movement being used when there are crowded or blocked conditions in the fish mass and preventing development of voids in the pack at such times while the can filling continues, the normal speed movement again taking up the work as soon as the crowded conditions have been relieved.

Another important object of the invention is the provision of such a fish compressing device which after operating upon its abnormal working cycle is automatically again brought into normal operation and timed with the other operations of the apparatus, the condition of the fish controlling this action.

An important object of the invention is the provision of can feeding devices in an apparatus of the character described which bring the cans into position for filling during which travel they are moved beneath the fish supply and out of line with any drip or losses of fish particles from the fish mass.

A further important object of the invention is the provision of an apparatus of the character described which utilizes an improved cutting and backing up device for segregating, from a fish mass, a fish charge of a given amount sufficient for filling a single can, this cutting action producing clean, even edges of the segregated fish parts.

An important object of the invention is the provision of an apparatus for filling fish into cans which insures a uniform fill in each can and which is driven through a gear transmission manually selected in accordance with the size of fish being fed into the apparatus, thus preventing any slack fill of cans and providing more flexibility in the fish handling operations.

A still further important object of the invention is the provision of a water supply system for a fish filling machine which makes the cleaning and washing of certain parts of the machine accessible to the cleaning fluid to permit removal of any fish accumulation caused by the various fish cutting and filling operations and which assists in the proper movements of the fish mass.

Numerous other objects and advantages of the invention will be apparent as it is better understood from the following description, which, taken in connection with the accompanying drawings, discloses a preferred embodiment thereof.

Referring to the drawings:

Figure 1 is a side elevation of an apparatus embodying the present invention;

Fig. 2 is an end elevation of the apparatus viewing it from the fish entrance or fish receiving end;

Fig. 3 is a plan sectional view taken substantially along the line 3—3 in Fig. 2;

Fig. 4 is a vertical sectional view taken substantially along the line 4—4 in Fig. 3;

Fig. 5 is an enlarged fragmentary plan view of the upper part of that part of the machine which is illustrated in Fig. 4, being viewed from a plane substantially indicated by the line 5—5 in that figure;

Figure 9:
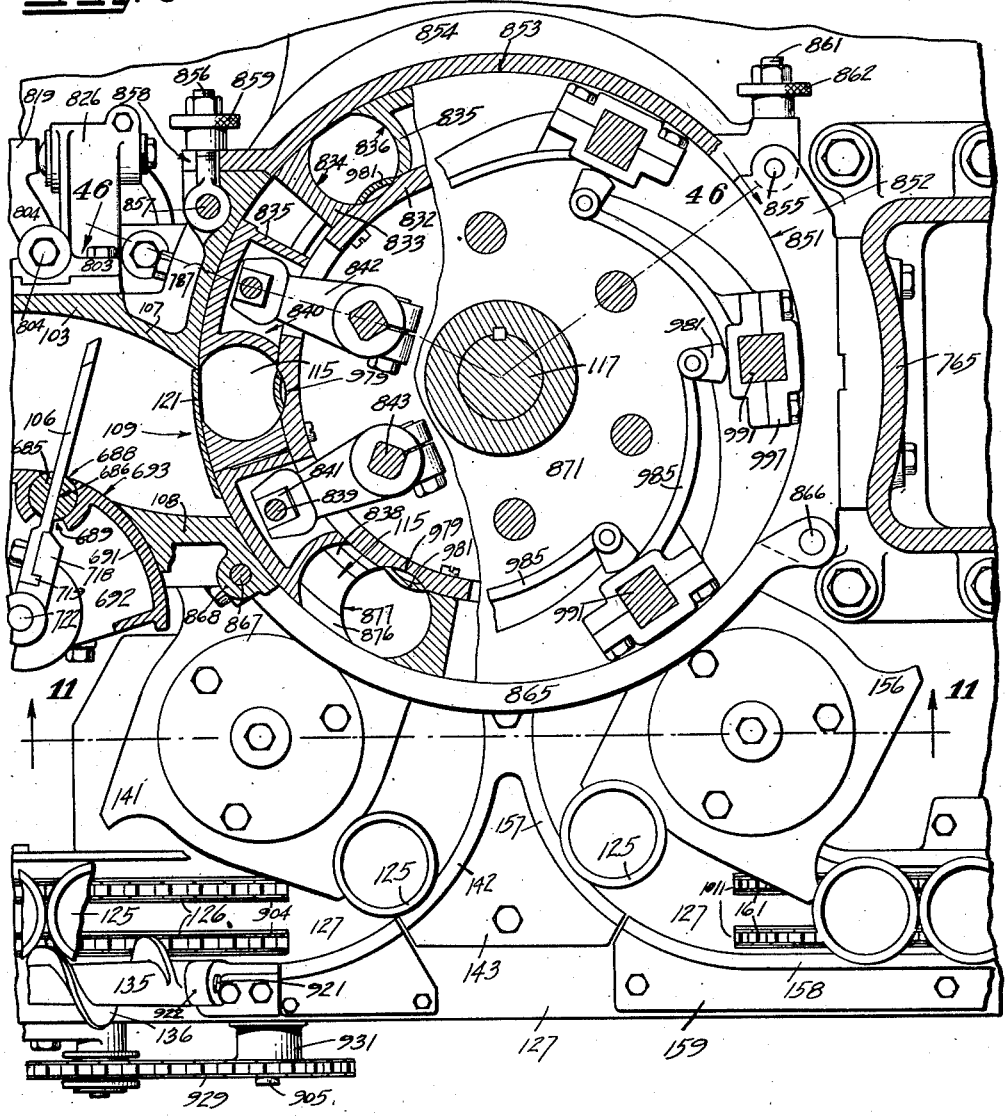
Figure 10:
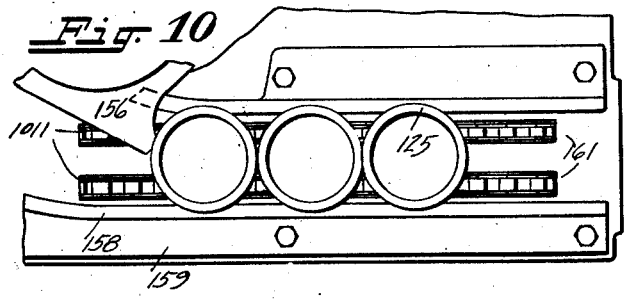
Figure 37:
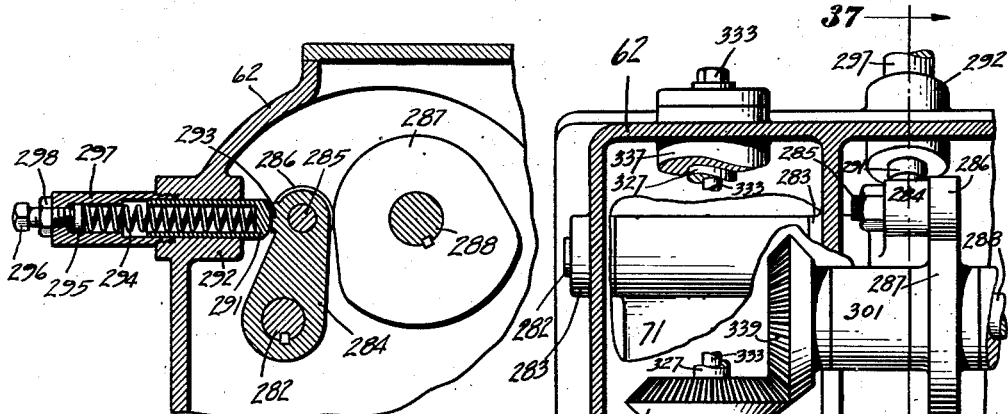
Figure 36:
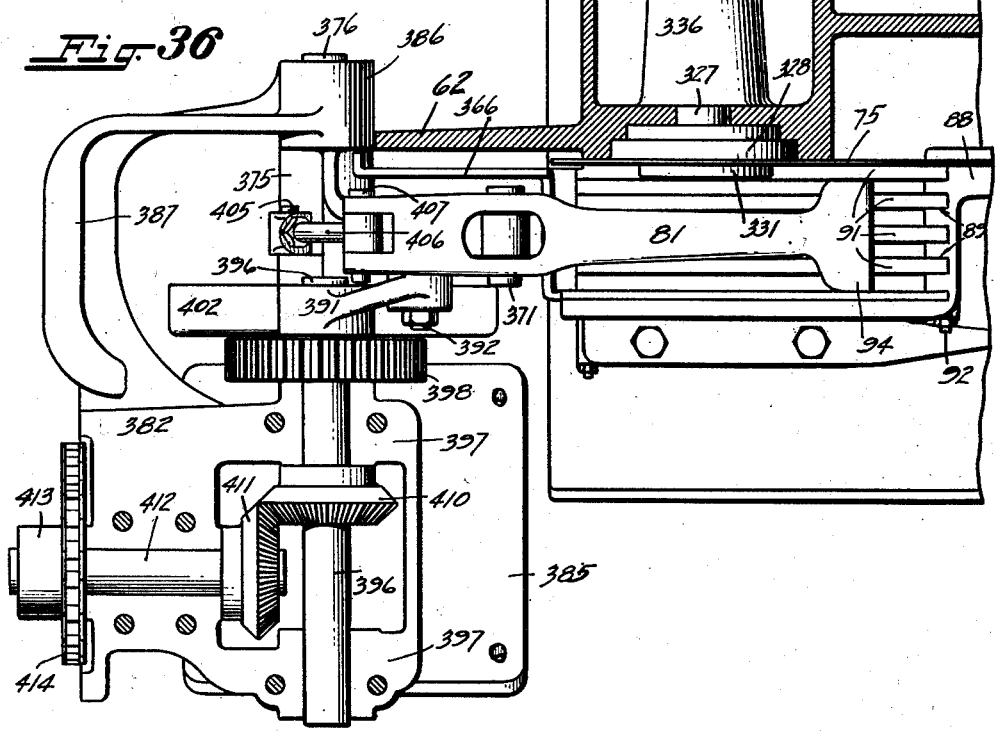
Figure 38:
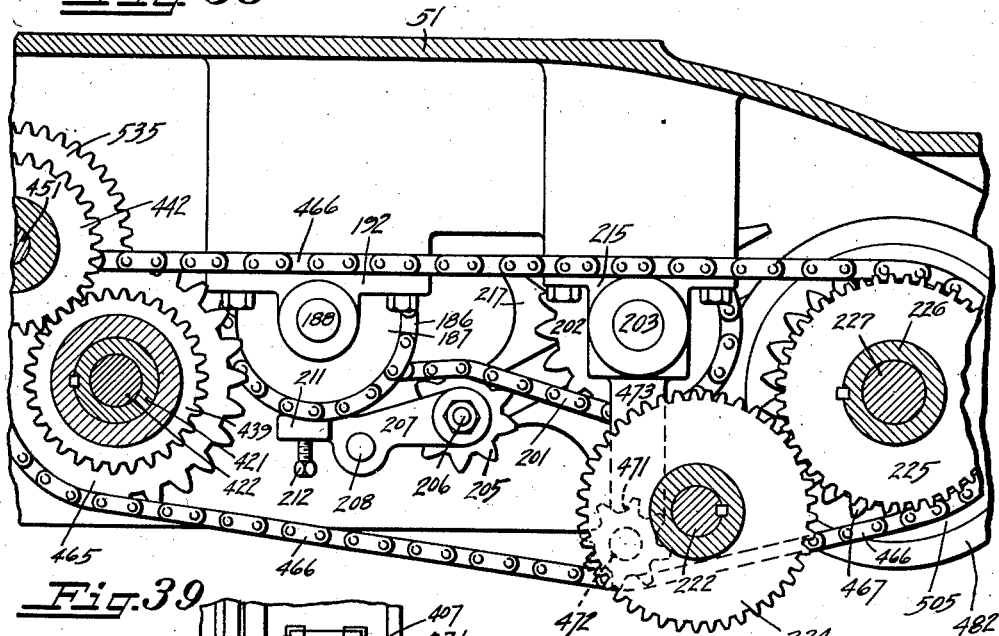
Figure 39:
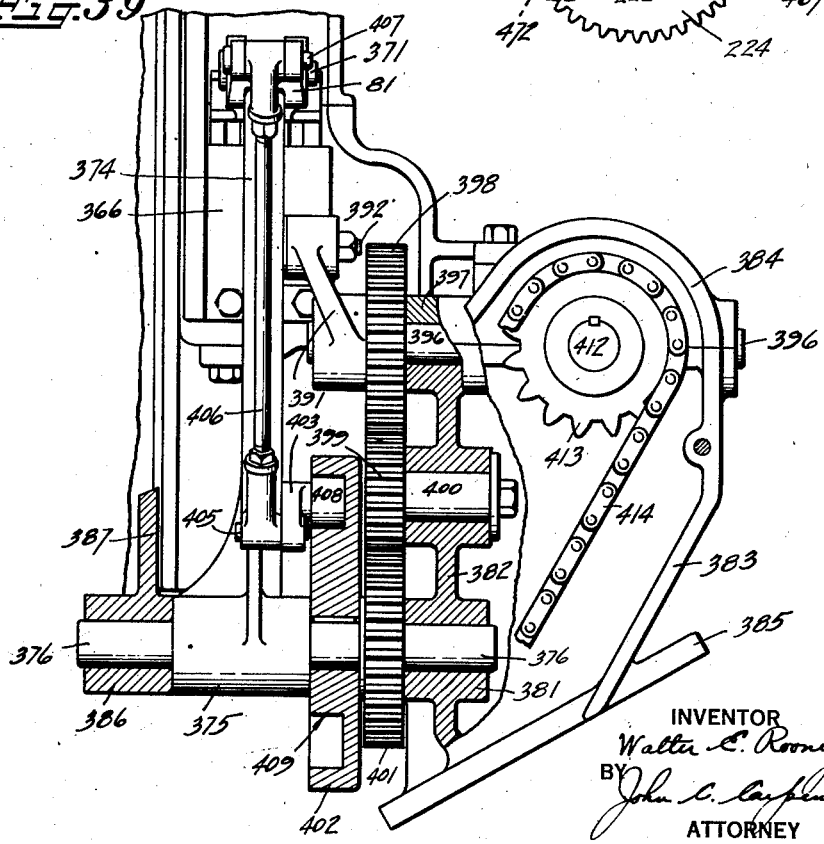
Figure 45:
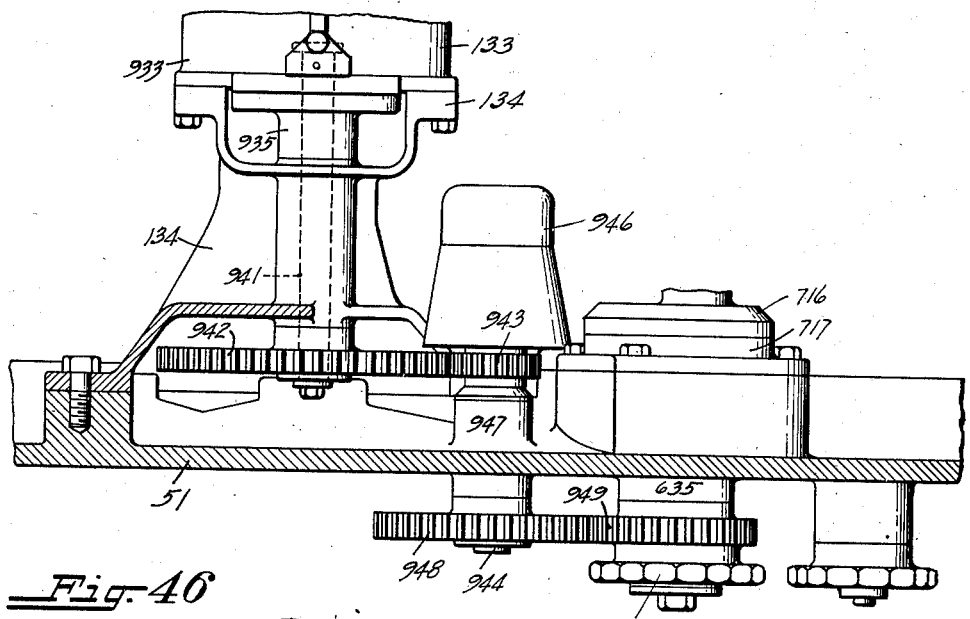
Figure 46:
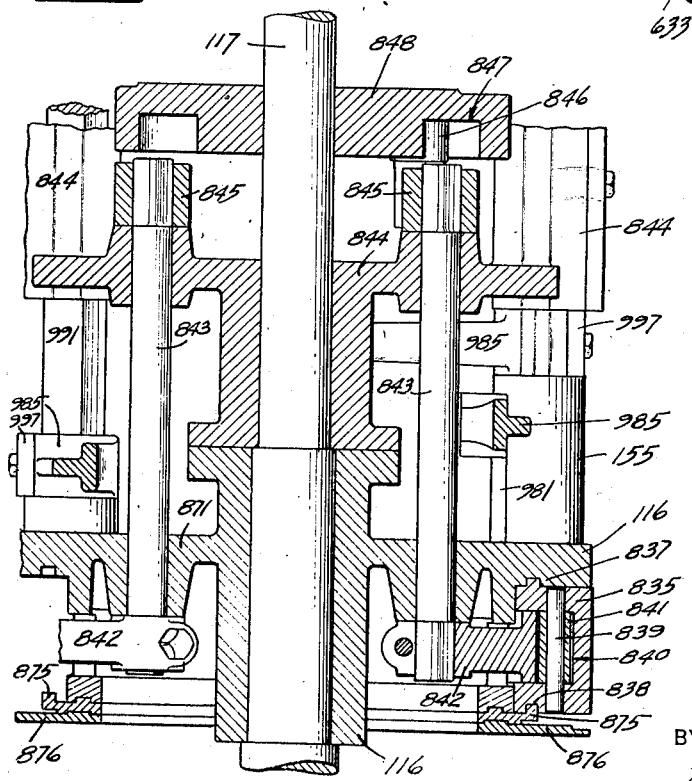

Figs. 6, 7, 8, and 9 are enlarged plan sectional views taken at various levels on the machine as indicated by the respective lines 6—6, 7—7, 8—8 and 9—9 in Fig. 4;

Fig. 10 is a plan detail which is a continuation of the right-hand end of the section shown in Fig. 9, the two figures together showing the machine at this place;

Fig. 11 is a transverse sectional view taken substantially along the line 11—11 in Fig. 9;

Fig. 12 is a transverse sectional view taken substantially along the line 12—12 in Fig. 3, parts being shown in elevation;

Fig. 13 is a plan sectional view of the transmission and gear shift for adapting the machine for operation on different sizes of fish, the view illustrating on an enlarged scale some of the parts shown in Fig. 3;

Fig. 14 is an enlarged plan sectional detail taken substantially along the line 14—14 in Fig. 4;

Figs. 15 and 16 are fragmentary plan views, with parts broken away, of the central part of the machine showing the tunnel and the advancing feeding instrumentalities for the fish in different positions;

Fig. 17 is an enlarged cross sectional view taken substantially along the line 17—17 in Fig. 3;

Fig. 18 is a sectional detail taken substantially along the line 18—18 in Fig. 16;

Fig. 19 is a plan detail with parts broken away, as viewed substantially along the broken line 19—19 in Fig. 17;

Figs. 20, 21, and 22 illustrate different positions of the segregating knife in the discharge end of the tunnel being viewed from a position substantially along the line 20—20 in Fig. 19;

Fig. 23 is an enlarged sectional plan view of the apparatus shown in the left-hand part of Fig. 3;

Figs. 24, 25, 26, 27, and 28 are sectional details taken substantially along the respective lines 24—24, 25—25, 26—26, 27—27 and 28—28 in Fig. 23;

Fig. 29 is an enlarged view of the left-hand end of the shaft illustrated in the upper left-hand corner of Fig. 3 showing the extension of and parts mounted on the shaft beyond that part which is shown in Fig. 3;

Fig. 30 is a transverse sectional view taken through the fish carrier chain, the receiving chamber, etc., being taken substantially along the line 30—30 in Fig. 23, Fig. 31 is a transverse sectional view taken substantially along the line 31—31 in Fig. 30;

Fig. 32 is a sectional view taken substantially along the line 32—32 in Fig. 31;

Fig. 33 is a transverse sectional view taken substantially along the line 33—33 in Fig. 30;

Figs. 34 and 35 are details illustrating the different positions of the feeding fork shown in Fig. 33;

Fig. 36 is a plan view of that part of the mechanism illustrated in Fig. 33, parts being broken away and parts of the enclosing housing being shown in section;

Fig. 37 is a sectional detail taken substantially along the line 37—37 in Fig. 36;

Fig. 38 is an enlarged transverse sectional view taken substantially along the line 38—38 in Fig. 3;

Fig. 39 is in part an end elevation as viewed from the left-hand side of the lower part of Fig. 36, adjacent parts being broken away and parts being shown in section;

Figs. 40 and 41 are parts of one assembly with their junction indicated by dot and dash lines, the views being enlarged sections taken substantially along the line 40—40 in Fig. 23;

Fig. 42 is a plan sectional view taken substantially along the line 42—42 in Fig. 11;

Fig. 43 is a transverse sectional view taken substantially along the line 43—43 in Fig. 42;

Fig. 44 is an enlarged plan sectional view taken substantially along the line 44—44 in Fig. 1;

Fig. 45 is a part elevation part section as viewed substantially along the line 45—45 in Fig. 32; and Fig. 46 is a sectional detail taken substantially along the broken line 46—46 in Fig. 9.

The apparatus disclosed in the drawings which constitutes a preferred embodiment of the present invention is particularly directed to the simplification and improvement of steps in the filling of fish into cans. In this filling operation the operator receives the fish on a filling table, the fish having been previously cleaned and head and tail removed. He places each fish on a chain carrier located adjacent and preferably fits the small or tail end foremost so that the tail of one fish is inserted in the belly of the next preceding fish. In this way a substantially continuous string or line of fish of somewhat uniform diameter is obtained.

Broadly considered as to operations the apparatus may be roughly divided into two general parts. The first has to do with feeding the whole fish, cutting it into certain lengths, and compresing together the cut lengths and feeding them along the first section of a tunnel. It is the object of these first operations to provide a given quantity of fish, packed together to form a given mass that will completely fill the tunnel section but that will not crowd the fish pieces into too compact a mass.

The second division of operations has to do with further feeding of the mass along the second section of the tunnel and discharging an amount of fish from the tunnel into a measure box. This measure box has a movable wall which compresses the fish into compact form and can shape forcing back the fish mass over the required amount to fill one can. The fish in the measure box is then segregated from the fish mass in the tunnel by means of a vertically moving knife, the shaped fish in the measure box then being discharged into the can.

The operations of this second part of the machine are substantially regular and uniform in their time elements since the same given amount of fish is handled, this being the amount received under proper compression in the second part of the tunnel. The fish which is initially introduced into the apparatus is not all of the same size and this affects time elements of the first section operations, which in practice start, pause, slow down, etc., according to the condition of the fish being brought into the tunnel. This will be fully brought out as the description proceeds.

Fish when received into the cannery run uniformly enough as to size to allow for a general size classification into which might be termed large fish or small fish. The apparatus herein disclosed is provided with a gear shift which adapts the working parts to a high speed or a low speed of operation to take care of fish size in such a general classification. This transmission gear shift affects only the first division of operations referred to in the preceding paragraph.

If the fish as a whole are small the driving of the first division of operations is increased (high speed) so that the second section of the tunnel will be properly filled. If the fish run large then a slower speed of feeding, cutting and compression is used. In both cases the aim is to supply a uniform amount of fish mass to the second division operations. The operating speed of the latter therefore remains unaltered.

The fish carrier comprises four parallel chains which operate over suitable sprockets so that the upper runs of the chains provide a floor or support for the fish string. Each chain carries small projections or spikes and the operator in positioning the fish into the chains impales them upon the spikes.

The fish carrier chains are moved intermittently and during normal operation of the machine the forward movement is followed in regular order or time by a rest period. During each forward movement the forward end of the fish string passes into and through a receiving chamber and into the entrance opening of a tunnel which is substantially rectangular in cross section. Where an abnormal condition arises by fish accumulation in certain parts of the machine as will be hereinafter fully explained, the chain feed may be interrupted in any part of its feeding stroke.

A rotary cutter normally continually operates in a housing positioned over the entrance end of the tunnel and this cutter is formed as the segment of a disc which, after the fish string has been inserted through the tunnel opening, engages and cuts through the fish as the cutting section of the cutter moves across the tunnel opening. This cutter, like the carrier chains, may be abnormally affected during a fish accumulation.

At the time of cutting a presser device located in the receiving chamber and mounted on an oscillating cam controlled shaft, moves down and holds the fish in the receiving chamber during the cutting operation. This cutting action cuts off an end of the fish string which is equal to the width of the tunnel at that point and this dimension is the proper filling height of fish for the can into which the fish is subsequently packed.

The top and rear walls of the tunnel adjacent its entrance end are slotted, these walls being in the form of grates, and a feeding fork having a forward forked end engages behind the cut section of the fish immediately following its severance and moves it longitudinally of the tunnel.

This feeding fork has a forward and backward movement and also an up and down rocking movement. When its forked end, on the feeding stroke, passes through the rear wall grating of the tunnel and engages behind the cut fish it is in its lowered position. As the fork advances on its forward reciprocating movement its forked end is kept at a substantially horizontal level and remains in engagement with the fish.

Upon reaching the forward end of the feeding stroke the forward end of the fork is backed away from the fish mass and is then raised out of the tunnel and out of engagement with the fish. It is held in raised position during its backward or return stroke. It is during this return movement that the next feeding action of the carrier chains takes place to insert the new end of the fish string through the entrance opening of the tunnel.

The continued feeding action of the fork presses the mass of cut fish along the tunnel, this action compressing the fish so that it completely fills the space. This fish movement carries it along a twisted section of the tunnel which brings the cut fish into a vertical position with its cut ends against the top and bottom walls of the tunnel.

As long as the machine is canning fish the tunnel is kept full of fish and the feeding fork insures the desired degree of compactness in the fish mass. If the fish compression becomes too great by crowding of too much fish into the tunnel then the feeding into the tunnel is interrupted until sufficient fish has been removed and put into the can to relieve this crowded condition.

Actuation of the fork is effected by a chain and gear drive which includes a ratchet device associated with a clutch mechanism. In the event that fish within the tunnel accumulates to a point where its compressed mass offers an abnormal resistance against the feeding operation, then the clutch and ratchet device operates to skip one or part of one forward movement of the fish within the tunnel. This depends upon the duration of the abnormal resistance. The chain feed, the cutter and fish pressing device is similarly affected.

When normal fish compression immediately follows a crowding of the fish, the feeding fork again resumes its feeding action and the chain feed, cutter, etc., also resume operations, provision being made, however, for always timing in the fork feed stroke, cutter movement, etc., with the other fish handling operations.

In the event that fish become wedged in the mouth of the tunnel causing the feeding fork to stop before it reaches the end of its stroke the ratchet device previously referred to comes into action and a definite time period of pause for the feeding fork takes place.

Following this period, the feeding fork moves forward to the end of its stroke without waiting for relief of the wedged condition. This movement of completion of stroke is at a greatly reduced speed, being substantially half of its speed of movement during its normal feeding stroke. After reaching the forward end of its stroke the fork starts back and the resistance against it being removed it is timed in and normally actuated at full speed.

In the second tunnel section two spaced forks or advancing and feeding instrumentalities further advance the fish mass. Each fork is introduced through the side walls of the tunnel and is forced into the fish mass. The first fork operates through one side wall of the tunnel and further along and in advance of this the second fork operates through the opposite side wall of the tunnel.

These forks are not operated in exact synchronism, the rear fork feeding a little faster, this insuring that the fish mass is always moved up to the forward fork. Following the forward movement, each fork is pulled out of the fish mass and out of the tunnel and is swung back to gain the proper position for another forward feeding stroke. Provision is made for allowing a pause in the feeding actions of either fork in the event that the fish mass being acted upon by that particular fork becomes too tightly packed or above its normal compression.

For this purpose the rear fork is driven through a slip friction so that it will stop if the fish mass ahead is too crowded. The forward fork is actuated through a yielding connection in like manner permitting its interruption of feeding.

Setting of the amount of friction for the rear fork and setting of the amount of resistance before yielding for the forward fork, determine the amount of compactness of the fish maintained in the tunnel. The discharge end of the tunnel is restricted and it is through this restricted discharge opening that the second side feeding fork moves the fish.

Measuring chambers, each bounded by fixed and movable jaw members, are carried on a continuously rotating turret and are passed successively adjacent the discharge opening of the tunnel. As a measuring chamber approaches the discharge opening it is extended to its maximum capacity and is opened along the side adjacent the end of the tunnel so that it receives a forward section of the fish mass which passes out through the tunnel opening.

The movable jaw member of each chamber is ahead and is open the furtherest for the largest chamber capacity when moved across the tunnel opening. This jaw then remains stationary and just beyond the tunnel wall during the filling of fish into the measuring chamber and while the rear fixed jaw carried with the turret is constantly approaching and dimensioning the size of the chamber. The fish passing from the tunnel into the chamber is thus subjected to the least cross movement. The side of the fish stream on the side of this forward and momentarily stationary jaw has practically only a forward movement into the chamber, this lasting until such time as the approaching jaw closes in on the face. These relative movements between the tunnel and the chamber jaws also insure a maximum of filling time.

The turret continually advances into the filled measuring chamber without interruption, and when the fish in the chamber is completely compressed, this being when the closed chamber is leaving the tunnel opening, the vertically movable knife comes down across the discharge opening and passes through the remaining connecting fish mass, completely severing the charge within the chamber from the fish remaining in the tunnel.

A clean cut without the presence of any ragged edges results. To assist in this severing operation a movable backing-up plate is used. This plate is located adjacent the discharge or forward end of the tunnel and is movable in a recess formed in the floor or bottom of the tunnel. The tunnel floor is cut through directly beneath the vertical knife and this opening is normally closed by the backing-up plate. Any moisture in the fish mass in the tunnel is also drained through this floor opening.

During the passage of the knife through the fish mass this backing-up plate holds the continuity of the tunnel floor and closes the opening in the bottom of the tunnel. As the lower cutting edge of the knife approaches the backing-up plate the latter is moved back by means of a cam control which operates through a spring connection. In its retracted position it clears the cutting edge of the knife, leaving a small opening in the floor of the tunnel into which the cutting edge of the knife passes.

The spring connection referred to includes two spring members of different forces. The stronger spring normally holds the backing up plate in tunnel floor closing position but this is released just before the knife completes its stroke. When the cutting edge of the knife enters the tunnel opening, the lighter spring is in control and this allows the backing up plate to quickly move out of the way of the knife edge as the knife completes its downward stroke.

Open top empty cans are brought into the machine on a continuously moving conveyor which comprises a pair of chains on which the cans ride. These chains move the cans in untimed processional order between suitable guideways and into a screw timing device.

During passage of the empty untimed cans to the timing screw a measured charge of salt is deposited in each empty can. A salting device located over the path of the incoming cans discharges the salt in the can as it passes beneath.

The timing screw times the cans into proper synchronism with the operations of the machine. Each timed can then passes from the screw into a starwheel which individually feeds it into the rotating turret. The starwheel moves the can on to a can lifting support unit carried in the turret. Each support is located directly beneath a measuring chamber. As cans move around in their circular path of travel with the turret they are lifted into filling position.

This positioning of the can into the turret takes place while a charge of fish is being received in its associated measuring chamber. The jaws compress the charge of fish into substantially cylindrical form having a diameter slightly less than the diameter of the inside of the can.

The cylindrical charge of fish is passed downwardly by a plunger associated with the measuring chamber and is thus introduced into the can, provision being made for venting the can of air during this filling with fish. The filled can is then lowered and brought into a discharge position where it is engaged by a discharge starwheel which sweeps it from the support unit and positions it onto a pair of discharge conveyor chains which carry it out of the machine.

*General construction*

All of the machine parts are carried in or upon a housing 51 (Figs. 1 and 2) which in turn is carried upon legs 52. A feeding table 53 is carried by a right angled bracket 54 secured to one side of the housing 51, this table resting in a horizontal plane and having a side wall 55. The fish, which have been previously drawn and have had head, tail and fins removed, are received upon the table from which they are then handled. This table 53 is located in a convenient position for the operator to insert the tail of one fish into the belly of a preceding fish so that a substantially uniform string of fish is fed into the machine in a continuous unbroken manner.

Four parallel fish carrier chains 58 (Figs. 2, 30 and 31) having spaced spikes 59 are suitably located adjacent the feed table 53 and pass alongside of the table wall 55. The operator in forming the fish string and feeding it into the machine places it upon the upper runs of the chains. The chains carry the fish into a receiving chamber 61 which is formed in a feed box casing 62 mounted upon the housing 51.

The carrier chains 58 are intermittently moved and pass the forward end of the fish supply from the chamber 61 into a tunnel 65 which is of substantially rectangular cross section. The tunnel at this end is mounted in an angular position relative to the chamber. An entrance opening 66 (Figs. 30, 33) is formed in one side wall of the tunnel and it is through this opening that the forward end of the fish string enters into the tunnel and is then pushed along the latter. The tunnel frame rests upon a support member 67 (Figs. 1, 17, and 33) formed with a base 68 which rests upon the housing 51.

A fish holder or presser device 71 is mounted in the chamber 61 above the fish (Figs. 30, 31). After the forward end of the fish supply has been passed through the entrance opening 66 and into the side of the end of the tunnel 65 this presser unit descends on the fish adjacent the tunnel opening. The supporting chains 58 at this time are at rest. The fish is then in condition for cutting.

A segmental disc cutter 75 (Figs. 30, 33) is used for the cutting operation. It is normally continuously rotated. Cutter 75 is disposed within a cutter housing 76 mounted upon the side walls of the tunnel 65 and upon the casing 62. At a time during its cycle of rotation it passes across the entrance opening 66 of the tunnel 65 and cuts through the fish.

That part of the fish which extends into the tunnel is thus severed from the remaining fish in the chamber 61. The width of the tunnel at this position, which determines the length of cut of the fish, is the proper length for the height of the can into which the fish is subsequently introduced.

The cut piece in the entrance end of the tunnel is thereupon pushed forward by a feeding fork or pusher 81 (Figs. 33 and 36) which is moved back and forth and which on its forward stroke compresses the cut fish sections into uniform compactness. The compression is so regulated that a given volume of fish taken from the mass will always weigh substantially the same. This permits filling into the can by gauging according to volume and all cans so filled will then be substantially the same weight.

The tunnel 65 at its fish receiving end is formed by a bottom wall 85 (Figs. 30 and 33) and an outside wall 86. Directly forward, the tunnel is also formed with a top wall 87 and a side wall 88 (see also Fig. 36). The side wall 88 terminates short of the entrance end of the tunnel to provide the opening 66.

The top wall 87 is formed with a series of slots 89 and the bottom wall 85 is also slotted. Right angled bars 91 provide an end and top grating for this end of the tunnel. These bars are held in the slots 89 where they are joined to the upper wall 87 of the tunnel by a tie bolt 92.

In a similar way a tie bolt 93 passes across the slots in the lower wall 85 and through the ends of the bars 91 to hold the latter at their lower ends. This grating encloses and confines the cut fish in the entrance end of the tunnel and permits operation of the fork 81. The fork is formed with downwardly extending fork ends 94 which move into and along the spaces between the bars 91.

The tunnel 65 is formed with a twisted section 95 (Figs. 1, 33 and 40) which, during passage of fish through the tunnel, turns the fish mass from its angular position into a vertical or upright position so that the grain of the fish and back bones are about vertical. One wall of this section is provided with air vents 96 (Figs. 1, 32 and 40) which allow the air to escape from the interior of the tunnel. This is highly desirable to prevent resistance and retardation to the rapidly moving fork 81. These vents are not large enough to allow for escape of the fish.

The end of this first section of the tunnel is formed with a flange 101 (Fig. 33) which is secured to a similar flange 102 formed in a straight walled auxiliary tunnel 103 (Figs. 1, 15, 16, and 17) which forms a continuation of the tunnel 65 and constitutes the second tunnel section already referred to.

The fish passing into the tunnel 103 is first engaged by a feeding fork 105 (Figs. 15, 16). This fork moves in through the side wall of the tunnel and into a mass of fish and then moves forward crowding the fish along. It passes the fish to a second feeding fork 106 which operates in a similar manner, moving into the fish mass from the opposite wall of the tunnel.

The fork 106 is located near the discharge end of the tunnel 103 which, at this place, is formed with curved side walls 107, 108 oppositely disposed. These walls provide a restricted discharge opening 109 through which the fish mass is crowded by the fork 106.

A series of spaced measuring chambers 115 (Figs. 4, 9, and 16) are carried in a turret 116 which is mounted on a vertical shaft 117 (Fig. 4). The measuring chambers 115 are carried adjacent the discharge opening 109 of the tunnel 103 by rotation of the turret 116 and the fish which is forced out through the discharge opening of the tunnel is crowded into the passing measuring chambers.

A vertically movable reciprocating knife 121 (Figs. 4, 9 and 20) is caused to move downwardly across the discharge opening 109 and through the fish mass when a chamber becomes filled. This action severs the charge of fish then within the measuring chamber from the fish mass remaining in the tunnel. This constitutes a measuring of the fish to go into the can and each charge so segregated is substantially of the same volume and weight as every other charge.

A movable backing-up plate 122 (Figs. 19 and 20) is located in the bottom wall of the tunnel 103 and is cam and spring actuated to normally close an opening 123 cut through the floor of the tunnel adjacent its discharge opening 109. This opening is directly beneath the knife 121. Water, fish particles, etc., drain through the opening 123 and leave only clean fish to pass into the measuring chambers.

The backing-up plate, in closing the opening in the bottom of the tunnel, provides a smooth pass for the fish as it moves out through the tunnel discharge opening. It also backs up the fish and assists the cutting knife 121 in the severing operation. It is moved to clear the cutting edge of the descending knife 121 by the knife itself, the cutting edge of the knife passing into the opening 123. A clean cut across the entire cross section of fish results.

Open top empty cans 125 (Figs. 9, 15, and 32) are carried into the machine on a pair of spaced carrier chains 126 and are moved over a table 127 supported by brackets 128 (Figs. 32, 42, and 43) bolted on the housing 51. The cans 125 during this passage are guided in a straight line of travel between spaced guide rails 131 carried on straps 132 (see also Fig. 1) which are bolted to the table 127.

During this travel the cans pass beneath a salting device 133 (Figs. 1, 32, and 45) which is carried by a bracket 134 mounted on the table 127. A measured charge of salt is projected into each can as it passes beneath.

The chains 126 move the cans into a timing screw 135 (Figs. 1, 9, and 15) which is continually rotated to cause a spiral thread 136 formed on the screw body to engage between adjacent cans 125 and bring them into time relation with the other movements of the apparatus. The timing screw 135 discharges the cans into a four arm starwheel 141 which sweeps them around a circular path of travel and inside of a curved guide wall 142 formed in a bracket 143 mounted upon the table 127.

A can turret section 151 (Figs. 4 and 8) is also mounted upon the turret shaft 117 directly below the turret 116 and carries a series of can support units 152, there being one unit positioned directly beneath each measuring chamber 115. The starwheel 141 positions each can upon one of the support units 152 and then they are carried in a circular path of travel with the revolving turrets.

Each measuring chamber is provided with jaw devices for compressing a charge of fish into can shape and after this compression is effected the charge is positively ejected by a downwardly moving filling plunger 155, carried with the turrets, which forces the fish into the positioned can directly beneath.

Each filled can still carried on its support unit 155 is then brought into position for discharge where it is introduced into a pocket of a four-arm discharge starwheel 156 (Figs. 9 and 10) which operates alongside of the starwheel 141. The discharge starwheel sweeps the filled can around a circular path of travel and inside of a circular wall 157 formed in a bracket 143. A continuation guide wall 158 carried on a bracket 159 further guides the can into a pair of discharge chains 161 which carry it out of the machine.

Fish carrier chains

The fish carrier chains 58, the segmental cutter 75, the fish presser 71 and the feeding fork 81 are all driven from one source of driving power so that the operation of one of these elements is properly associated at all times with the operation of the others. This insures synchronism of the different actions of positioning, holding, cutting and moving the fish along the tunnel 65 and into the tunnel 103. These movements constituting the first group of movement previously referred to are independent of the other operations (second group) which further act on the fish after being received in the tunnel 103.

The unit driving power for this first group is so transmitted as to provide for abnormal conditions which may arise in connection with the feeding of the fish and to maintain the unity of operation between the elements even through the normal operations are interrupted. This will be brought out in the following detailed consideration.

The chains 58 (Fig. 2) for the fish supply operate over a multiple idler sprocket 175 which is carried on a shaft 176. Shaft 176 is supported in a shell 177 mounted on a bracket 178 extending outwardly from the casing 62. The forward parts of the carrier chains 58 pass over a multiple drive sprocket 181 (Figs. 30 and 31) which is located in the chamber 61 and is adjacent the tunnel opening 66. The sprocket 181 is keyed on a horizontal shaft 182 journaled in bearings 183 formed in the casing 62.

Shaft 182 also carries a sprocket 185 which is located outside of the chamber 61 and at the inner end of the shaft. A link chain 186 operates over the sprocket 185 and extends down into the housing 51 where it passes over a sprocket 187 keyed to a horizontal shaft 188.

The shaft 188 (Figs. 23 and 31) is journaled in bearings 191, 192 formed in brackets 193, 194 bolted to bracket extensions 195, 196 formed in the housing 51. The sprocket 187 is a composite or double sprocket and is an integral part with a sprocket section 197. A collar 198 is secured to the shaft and is located adjacent the bearing 191. This holds the double sprocket in proper working position.

A chain 201 (Figs. 23, 30, and 32) operates over the sprocket section 197 and also over a sprocket 202 keyed to a Geneva wheel shaft 203. A chain tightener sprocket 205 located on a stud 206 may be used to hold the chain 201 taut between its sprockets. This stud is held on the end of a lever 207 which is pivoted at 208 to a block 209 (Fig. 17) formed as a projection from the bearing 192.

The lever 207 is extended on the opposite side of its pivot as a lug 211 which carries a setscrew 212 adapted to rest against the under face of the the block 209. By adjusting the position of the setscrew the sprocket 205 is moved into the desired position to properly tighten the chain 201.

The shaft 203 is journaled in bearings 215 (Figs. 23, 30, and 32) which are formed in brackets 216 bolted to the housing 51. The sprocket 202 is preferably an integral part of a Geneva wheel 217. A collar 218 secured by a setscrew to the end of shaft 203 holds it within its bearings 215.

It is by means of a Geneva wheel drive, or which the wheel 217 and the shaft 203 are the driven elements, that the intermittent movement is obtained for the carrier chains 58. The Geneva wheel 217 is driven by a Geneva arm 219 (Figs. 23 and 32) which carries a roller 220 operating in radial slots 221 formed in the Geneva wheel. This arm 219 and roller 220 constitute drive elements for the Geneva unit.

The arm 219 is secured to a horizontal shaft 222 (Figs. 13, 23, and 32) which is journaled in bearings 223 formed in the housing 51. This shaft 222 is continuously driven as long as normal feeding of the fish takes place but may be interrupted when there is too much fish introduced into the tunnel 65. This will be further and more fully explained.

The shaft 222 carries a spur gear 224 (Figs. 23 and 38) which meshes with a similar gear 225 keyed to a sleeve 226 which surrounds one end of a longitudinal clutch driven shaft 227. The sleeve 226 extends into and is supported at one end by a ball bearing unit 228 carried in a cage 229 bolted to the housing 51. It is the sleeve 226 that provides the bearing for the end of the shaft 227 which extends into the sleeve. A spacing sleeve 231 is located on the sleeve 226, being interposed between the bearing unit 228 and the gear 225 and this keeps the parts in proper position.

The end of the shaft 227 (Fig. 13) opposite the bearing unit 228 is journaled in a bearing 232 formed in a part of the housing 51. The sleeve 226 carries one element of a dog clutch 233 (Fig. 23) and the shaft 227 carries the other element. This dog clutch acts as a timing device and only provides a connection between sleeve and shaft for unified movement when all parts associated therewith are in proper position. This will be further described in connection with the feeding fork 81.

The shaft 227 is the driven shaft through which the gear shift or gear transmission operates. This shaft (Figs. 3 and 13) carries a gear 234 which is keyed to the shaft and which is formed with a hub cut across with radial slots 235 forming a tongue and groove face on the hub. This slotted hub provides one part of a transmission clutch which when the gear transmission is set for high speed operation interlocks with a hub 236, similarly slotted, of a gear 237 mounted on one end of a drive shaft 238.

The gear 237 has sliding movement relative to the shaft 238, its hub being cut through with a featherway and moving over a feather 239 which insures rotation of the gear with the shaft regardless of their longitudinal relation. When the gear hubs 235, 236 are interlocked (as in Fig. 3) the shaft 227 is driven by direct connection with the shaft 238. The gears 234, 237 merely turn with their respective shafts but perform no work as gears. This transmission will be used when the fish are running small.

When the gear hub 235 is out of engagement with the gear hub 236 (as in Fig. 13) there is no direct connection between the shafts 227, 238 and the former is then driven from the latter through a gear train which embodies the gears 234, 237. This is the slow speed transmission which will be used when the fish are running large.

The gear 237 at such time meshes with a gear 240 (Figs. 13 and 17) keyed to a shaft 241 which is journaled in bearings 242 formed in the housing 51, one of the bearings being located in the same bracket as the bearing 223. Shaft 241 also carries a gear 243 which meshes with the gear 234. When the sliding gear 237 is in engagement with the gear 240 rotation of the shaft 238 is transmitted through gears 237, 240 through the shaft 241 and through gears 243, 234 to drive the shaft 227.

It will be observed that the gear 237 is the shift gear and is moved from one position to the other to effect high speed or low speed transmission to the shaft 227. Shifting is done manually at the will of the operator. The gear 237 is formed with a hub 244, on the side opposite to its slotted hub 236, and an annular groove 245 is formed in its periphery.

A yoke 246 (Figs. 3, 13, and 17) carries rollers 247 on its yoke ends and these extend into the groove 245 and engage the walls of the groove when shifting the gear 237. This construction permits unhampered rotation of the hub 244 at all times and allows for longitudinal movement of the gear on the shaft 238 when the yoke 246 is rocked one way or the other.

The yoke 246 is carried on one end of a horizontal rock shaft 248 which is journaled in a bracket 249 secured to an inside wall of the housing 51. The shaft 248 at its outer end carries a hand manipulating lever 250 (Fig. 1) which has two positions, one in which the gear 237 is held in mesh with the gear 240 and the other when the hub 236 of the gear 237 is interengaged with the hub of the gear 234.

The shaft 238 (Figs. 3 and 13) is journaled in bearings 251 formed in the housing 51, one being adjacent the collar 244, the other at the opposite end of the shaft. Shaft 238 carries a bevel gear 252 (see also Fig. 12) which meshes with a gear 253 carried on a stud 254 held in the wall of the housing 51. The gear 253 is preferably an integral part of a gear 255 which meshes with a pinion 256 mounted on one end of a horizontal shaft 257.

The shaft 257 is journaled at one end in a ball bearing cage unit 258 bolted to the housing 51. The opposite end of the shaft is journaled in a similar bearing unit 259 also bolted to the housing on the opposite side. Shaft 257 carries a gear 261 which meshes with a pinion 262 mounted on a pulley shaft 263 which carries a friction drive pulley 264 in which any usual friction clutch unit 265 may be incorporated.

The shaft 263 is journaled in a bearing unit 266 carried in a cage 267 bolted to the housing 51 and in a bearing 268 (Figs. 2, 3, and 13) formed on the outer end of a bracket 269 which is bolted to the housing 51. Rotating power for driving the apparatus is suitably applied to the pulley 264.

The friction clutch unit 265 is operated to connect and disconnect the pulley shaft 263 and the pulley 264 and this is done by any suitable system of hand levers, rods, etc., controlling a sliding collar 271 mounted on the shaft 263. The details of such a system of levers will be determined by the conditions under which the machine is operated and no disclosure will, therefore, be made in the drawings other than to show the sliding collar 271.

Rotation of the pulley shaft 263 is transmitted eventually to all parts of the machine as will be hereinafter set forth in proper place. Such rotation is thus transmitted through the described gear and shaft connections and through either the slow or high speed gear transmissions to effect rotation of the Geneva arm shaft 222 only if the timing unit clutch 233 provides the proper connection between the shaft 227 and the sleeve 226.

If shaft 222 is rotated the Geneva unit translates the continuous movement into a step by step movement which is imparted through the connections described to intermittently move the fish carrier chain sprockets 181. The fish line is thus moved into the chamber 61 and out through the tunnel opening 66 into the entrance end of the tunnel 65 as illustrated in Fig. 30. It is following such movement that the cutter 75 severs a length of fish from the fish supply.

*Fish presser*

The fish presser 71 (Figs. 30 and 31) holds the fish in position against the floor 85 of the tunnel 65 during the cutting action. The presser 71 constitutes an arm which is widened at its free end into a fish engaging foot 281. This foot is nearly as wide as the chamber 61 and wider than the total space of the chains 58.

The presser arm is mounted on a rock shaft 282 (see also Figs. 36 and 37) which is journaled in bearings 283 formed in the side walls of the casing 62. The presser foot 281 is cam held in raised position during the introduction of the fish into the tunnel. The shaft 282 for this purpose carries an arm 284 on the end of which is threadedly secured a stud 285. A cam roller 286 is rotatably mounted on the stud and engages the periphery of a cam 287 keyed to a horizontal shaft 288.

A spring barrel 291 is slidably mounted in a boss 292 formed in the casing 62 and one end projects against the arm 284, engaging a pad 293 formed on the arm. A spring 294 extends partially within the spring barrel 291 and holds it against the arm. It is this spring that provides the active force for the presser 71 when holding the fish, the cam 287 operating positively in lifting the presser. The exact position of the presser foot 281 when in holding position will vary in accordance with the size of the fish being held and the spring 294 allows for this difference.

The opposite end of the spring 294 abuts against a disc 295 which is held in place by an adjusting bolt 296 threadedly engaged in a sleeve 297 which in turn is threaded to the boss 292.

A locknut 298 threadedly mounted on the bolt 296 holds it in adjusted position. Movement of the disc 295 changes the compression of the spring 294 and allows for adjustment of the amount of force applied by the presser when holding the fish.

The shaft 288 is mounted in bearings 301 (Figs. 31 and 36) formed in the casing 62 and is continually rotated as long as the Geneva arm shaft 222 is moving. In other words, the shaft 288 rotates as long as normal fish feeding conditions obtain. A sprockets 305 is keyed to one end of the shaft and a chain 306 (Figs. 23, 31, and 41) operates over the sprocket 305. This chain also passes over a sprocket 307 which is mounted on the shaft 222 adjacent the Geneva arm 219.

A pair of idler sprockets are utilized to direct the chain properly so that it will be confined within the casing 62 and within the housing 51. One of these idler sprockets, indicated by the numeral 309, is rotatably mounted on a stud 311 secured in a bracket 312 mounted on the casing 62. The second idler sprocket, indicated by the numeral 313, is keyed to a shaft 314 which idly turns in a bearing 315 formed in the casing 62.

Fish cutting

The cutter 75 which cuts through the fish string is formed with a cutting edge 325 (Fig. 33). Its periphery roughly follows a spiral curve, the outermost line of which terminates at the end of a vertical wall 326. This shape of cutter allows for continuous movement with intermittent cutting action.

As soon as the wall 326 passes the tunnel opening 66 this opening is unrestricted during a time slightly in excess of ninety degrees of cutter rotation. During that time the chains 58 move and the end of the fish string passes into the tunnel. The cutting edge enters the fish wall slowly and at its top and increases its depth of cut as the cutting continues. This is a feature of the spiral shape of the cutting edge 325 (Fig. 33). It will be observed that this produces a shear cut.

The cutter 75 is mounted upon the forward end of a sleeve 327 (Fig. 30) which is formed with a head 328 which backs up the cutter adjacent its center. A locking washer 331 formed with a hub projection 332 extends into the opening in the center of the cutter 75 and into the face of the head 328 of the sleeve. A tie bolt 333 extends longitudinally of the sleeve 327 and is threadedly engaged in the disc 331.

The head of this bolt engages a washer 334 and clamps the washer against the end of the sleeve and the head of the sleeve against the cutter, making a compact unit. A dowel pin 335 extends into the parts 328, 331 and passes through the cutter 75 preventing turning of one part on the other.

The sleeve 327 is journaled in bearings 336, 337 formed in the casing 62, the bearing 336 being countersunk to accommodate the enlarged head 328 of the sleeve. As long as normal fish feeding conditions obtain, as long as the feed chains 58 normally operate and as long as the presser 71 is normally actuated, the sleeve is continually rotated by connection with the shaft 288. A gear 338 is keyed to the sleeve for this purpose and meshes with a similar gear 339 which is carried on the forward end of the shaft 288.

The cutter 75 operates partially within the casing 62 (Figs. 30 and 33) and in the cutter housing 76, the latter being formed as a half circular shell comprising a rear wall 341, a front wall 342 and a connecting peripheral wall 343. The wall 342 merges into a laterally extended wall 344 which in turn merges into a spaced front wall 345. The walls 344, 345 enclose a chamber 346 which is located directly above the tunnel 65 adjacent its entrance end.

The wall 345 rests upon the tunnel wall 86 and the wall 341 rests upon the casing 62. This half circular shell (Figs. 1 and 33) is hinged on the tunnel wall and can be thrown back to expose the cutter 75 and the top part of the tunnel. The wall 344 is extended into lugs 348 to provide this hinge mounting and these lugs pivotally engage a pin 349 carried in a lug 351 formed in the tunnel wall 87.

Fish feeding work

After each length of fish has been cut from the fish supply by the cutter 75 it is ready for movement along the tunnel by the feeding fork 81. The forward part of this fork operates in the chamber 346 and on its backward stroke its rear end passes into a chamber 361 (Fig. 33).

This latter chamber is confined within a hinged protecting shell 362. A lug 363 (Figs. 1, 2 and 33) of the shell is pivotally carried on a pin 364 which is held in a lug 365 projecting outwardly from the shell wall 343. By lifting the shell 362 on its pivot 364 access is had to the fork 81. A Z form of plate 366 (Figs. 33, 36, and 39) is bolted to the tunnel floor 85 and partially forms a partition wall between the chambers 346, 361.

The fork 81 is pivoted on a pin 371 (Figs. 33, 36, and 39) carried in the upper end of an arm 374. This arm is formed at its lower end with a hub section 375 which is loosely mounted on a horizontal shaft 376. The shaft 376 at one end is journaled in a bearing 381 formed in a casing 382 (see also Fig. 2).

The casing 382 has an outer section 383 which acts as a chain housing and is surmounted by a bearing cap 384. Its inner part contains the bearing 381 and also other bearings. These parts are carried on a foot 385 which rests upon and is bolted to an end wall of the housing 51. The other end of the shaft 376 is journaled in a bearing 386 formed in a bracket 387 extending outwardly from the casing 382.

The fork 381 receives its forward and backward movement by a rocking of the arm 374 on the shaft 376. To effect this motion there is provided a crank arm 391 (Figs. 35, 36, and 39). This crank arm carries a stud 392 which engages a slide block 393, the latter moving up and down in a longitudinal slot 395 cut in the arm 374 as the stud describes a circular path of travel and rocks the fork 81 forward on a feeding stroke and backward on an idle stroke.

When the fork 81 moves back on its idle stroke its fork end 94 is lifted by a pivoting of the fork on the pin 371. This pivotal movement is cam operated, the cam used for the purpose being moved with the shaft 376. The shaft 376 is so associated with the crank arm as to insure the proper lifting and lowering of the fork end 94 as the fork 81 rocks back and forth.

The crank arm 391 is keyed to the end of a shaft 396 which is located above and parallel to the shaft 376. Shaft 396 is journaled in bearings 397 (Figs. 36 and 39) formed in the casing 382 and in the bearing cap 384. This shaft 396 drives the shaft 376 through a gear train best shown in Figs. 34 and 39.

A gear 398 is keyed to shaft 396 and meshes with an intermediate gear 399 which turns on a stud 400 carried in the casing 382. This intermediate gear also meshes with a gear 401 keyed to the shaft 376. A cam 402 (see also Fig. 35) is keyed to the shaft 376 and this cam moves as long as the crank arm 391 operates.

A lever 403 is pivoted on a stud 404 carried in the arm 374. One end of the lever is pivotally connected at 405 to a connecting rod 406 the opposite end of which is pivotally connected at 407 to the end of the feeding fork 81. The lever 403 carries a cam roller 408 which operates in a cam groove 409 formed in the face of the cam 402.

By means of this construction the lever 403 is rocked by the cam 402 as long as the cam shaft rotates and the fork 81 is accordingly rocked on its pivot 371. This composite movement of the fork 81 is effected by rotation of the shaft 396 which carries a bevel gear 410 (Fig. 36) meshing with a similar gear 411 mounted on a short shaft 412 carried in a bearing formed in the casing 382.

The shaft 412 at its outer end carries a sprocket 413 over which a chain 414 operates (Figs. 2, 3, 29, and 39). The chain 414 also passes over a sprocket 415. A chain tightener sprocket 416 is carried on a stud 417 secured to the casing section 383 and keeps the chain 414 in proper working condition.

A lower casing section 418 abuts the casing section 383 and provides a housing for the lower part of the chain. This casing section 418 is formed with a bracket or foot extension 419 which is bolted to the housing 51 as best shown in Fig. 2. The two casings 383, 418 and the bearing cap 384 function as a unit and are separately formed to permit easy manufacture and assembly.

The sprocket 415 (Fig. 29) is keyed to a sleeve 421 which is loosely carried on a shaft 422. The shaft and sleeve are jointly supported for rotation in two different bearings, one being a journal for the shaft and through it the sleeve, the other for the sleeve and through it the shaft. The end of the shaft away from the sprocket 415 is journaled in a roller bearing unit 423 (Fig. 23) located in a bracket 424 formed in the housing 51. The sleeve 421 adjacent the sprocket 415 is journaled in a ball bearing unit 425 (Figs. 23 and 29) which is mounted within a cage 426 bolted to the housing 51.

The shaft 422 and sleeve 421 rotate in the same direction but there is usually a slight creeping of the one relative to the other. During normal operation of the feeding fork 81 the shaft is driven at one speed of rotation and the sleeve at a slightly slower speed, the shaft thus creeping ahead of the sleeve.

The manner of obtaining this creeping action will be hereinafter described. A slip clutch 427 (Figs. 2 and 29) is used as a proper connection between the sleeve and the shaft, such a device allowing for the slipping action while still maintaining a frictional engagement between the parts.

The sprocket 415 carries a disc 428 which constitutes one element of the slip clutch, this disc being keyed to the sprocket. The disc partially encloses a friction element 429 one face of which is in frictional engagement at all times with the disc 428. The opposite face of the element 429 engages the face of a spring held disc 431 mounted on the end of the shaft 422. A feather 432 on the shaft operating in a featherway formed in the disc 431 insures turning of the latter with the shaft and at the same time allows for longitudinal sliding movement of the disc.

A spring 433 is associated with the disc 431, one end of the spring being disposed on the hub of the disc and its opposite end being confined by adjusting and lock nuts 434. These nuts are threaded on a collar 435 held on the end of the shaft 422 by a bolt 436 passing through a washer 437.

The position of the nuts 434 upon the collar 435 determines the amount of compression put upon the spring 433 and this controls the friction maintained in the slip clutch. The parts may be disassembled for purposes of cleaning or otherwise without changing the setting upon the collar 435.

A gear 439 (Figs. 23 and 38) is keyed on the opposite end of the sleeve 421 and a spacing sleeve 441 positioned on the sleeve fills in the space between the gear and the bearing unit 425. This gear 439 meshes with a gear 442 formed in a clutch block 443 which constitutes one part of a dog clutch 444. This dog clutch and associated parts are directly involved with the two feeding speeds of the fork 81, that is, the normal feeding speed and the abnormal slow speed.

The clutch element 443 is loosely mounted on a horizontal shaft 451 (Figs. 23 and 38) which is journaled in bearings 452 formed in a cover plate 453 bolted to the housing 51. The other element of the dog clutch 444 comprises a clutch block 455 which is also loosely mounted on the shaft 451. Normally the clutch elements turn in unison, the block 443 driving the block 455.

The unit 443 (Fig. 24) has two lugs 456, 457 projecting out toward the face of the unit 455 and the latter has a single lug 458 extending toward the unit 443. The lug 458 at times moves between the lugs 456, 457 but during normal operation of the machine, when the block 443 is driving the clutch, the lug 456 is held against the lug 458 this position being shown in Fig. 24.

The element 443 is normally continually rotated through the gears 439 and 442, by a sprocket and chain drive best illustrated in Figs. 23 and 38. The gear 439 is secured to or formed as an integral part of a sprocket 465 over which a chain 466 operates. This chain 466 is driven by a sprocket 467 located on the sleeve 226 adjacent the timing device 233.

A chain tightener 471 is used in connection with the chain 466 being mounted on a stud 472 carried in a bracket 473 extending down from and formed as a part of the bearing 215.

The sprocket 467 is rotated from the shaft 227 when the timing device 233 connects the sleeve 226 with the shaft. This is during normal feeding conditions in the tunnel 65. The manner of accomplishing this connection will now be described in detail.

The sprocket 467 is bolted on the side of a ring 476 (Fig. 23) which is loosely mounted on the sleeve 226. A circular block 481 (see also Fig. 27) constitutes a part of the timing device and is keyed to the end of the sleeve adjacent the ring 476. A disc 482 of the timing device is loosely mounted on the shaft 227 and one face of this disc abuts one side of the block 481.

A latch unit is carried in the block 481 and provides the direct driving connection between the elements 476, 481 and 482 of the timing device. A driving connection, however, can only be made when the latch unit carried in the block 481 is in a certain position relative to the disc 482.

Rotation of the shaft 227 is communicated to the disc 482 through a slip clutch 483. This slip clutch is similar in construction to the slip clutch interposed between the shaft 422 and the sleeve 421 and which is illustrated in Fig. 29.

Clutch 483 functions as an equalizer or shock absorber as well as a driving connection and takes up any shocks which occur when the latch unit of the timing device brings the elements into connection. By means of the clutch 483 a slight slipping between the shaft 227 and the disc 482 takes place until after the load has been completely picked up through the timing device.

The slip clutch 483 comprises a disc 485 which is keyed to a hub of the disc 482. The disc 485 partially encloses a friction element 486, one face of which frictionally engages the disc 485. Its other face is frictionally engaged by a spring held disc 487 formed with a featherway which slides along a feather 488 carried in the shaft 227.

Shaft 227 is threaded at 489 and adjustment and lock nuts 491 are threadedly engaged on the shaft at this section. These nuts confine a spring 492 which is mounted on a stem of the disc 487, one end of the spring resting against the disc and the opposite end against the nuts. This construction permits adjustment of the spring compression and provides the proper friction for the slip clutch.

The latch unit which connects together the ring 476, the block 481 and the disc 482 comprises a short cylindrical section 493 (Figs. 23 and 27) which is mounted for oscillation in a seat 494 formed in the block 481. This section 493 carries a latch 495 which has slight movement within a slot 496 cut across the cylindrical face of the block 481. The two walls of this slot are substantially at right angles and merge into the wall of the seat 494.

The section 493 also carries an arm 497 (Figs. 23, 27, and 28) which carries a pin 498 on which a roller 499 is mounted. This roller extends into a slot 501 formed in the ring 476.

One end of the slot 501 is closer to the center of the shaft 227 than its opposite end and when the roller 499 is closest to the periphery of the ring 476, this being furthest from the center of the shaft 227 (Fig. 26) the latch 495 is in the position illustrated in Fig. 27. In such position it is confined entirely within the slot 496 and does not project beyond the peripheral wall of the block 481. This is the unclutched position of the timing device.

When the parts are operating normally the roller 499 is in the opposite end of the slot 501 that is closer to the center of the shaft 227. The latch 495 then extends beyond the periphery of the block 481 and driving connection is established as soon as the proper relation is had between the rotating disc 482 and the block 481.

The disc 482 carries a striking ring 505 which is disposed in the same vertical planes as the latch 495 of the timing unit, the disc 482 substantially enclosing the block 481, as best illustrated in Fig. 23. The ring 505 along its inner wall is formed with spaced shoulders 506 and when the latch 495 is projected from the periphery of the block 481 the ring 505 moves over the block until one of the shoulders engages the end of the latch.

This connects through the parts described to move the fork 81, all of the parts being then in proper timed relation so that resumption of movement of the fork is in proper time with the associated movement of the cutter 75 and with the feeding of the fish on the chains 58.

When the fish accumulate in the tunnel 65 to the point where they block movement of the fork 81 the stoppage of the fork is communicated through the described connections to the sprocket 467. The ring 476 of the timing device 233 is thus brought to rest. The block 481 is still moving with the disc 482.

The movement of the block 481 carries the roller 499 of the latch unit along the slot 501 and at the same time the roller moves away from the center of the shaft 227. This rocks the latch element 493 in its seat 494 throwing the latch 495 back into the slot 496 and disengaging it from its shoulder 506 in the ring 505. The timing unit is then unclutched and the block 481 accordingly comes to rest leaving only the disc 482 with its ring 505 moving.

With the ring 476 and the block 481 both standing still, the sleeve 226 is accordingly without movement and the cutter 75 and the feeding chains 58 are not operating. This unclutching of the timing device 233 takes place every time the fork meets sufficient resistance to stop its travel.

The length of time the timing device will remain unclutched depends upon two general time conditions. The first includes the relatively short stoppage periods less in duration than the time required between subsequent cans as they are discharged from the machine after filling. This will be referred to as a single cycle of operations. The second class of time conditions are those where a continued abnormal resistance against feeding extends over a period of time greater than one cycle.

In the first class relieving of the resistance against feeding will permit enough movement of the fork 81 to shift the latch unit in the timing device 233 and to permit the shaft 227 to again pick up the load. The fork at such a time (while the timing device 233 is unclutched) is picked up through the slip clutch 427 with the shaft 422 driving instead of the sleeve 421. The resumed movement of the feeding fork in all such cases is then timed in through the timing device and is thereafter carried on through the chain 466 and the sleeve 421 in the normal way.

The shaft 422 is continually rotated and as soon as resistance against feeding of the fork stops rotation of the sleeve 421, the shaft continues to turn in the sleeve and continues to rotate the disc 431 of the slip clutch 427 (Fig. 29). This moving part of the slip clutch is thus always available to pick up and move the sprocket 415 as soon as the fork is free to move under the friction of the clutch. Movement of the shaft 422 is effected in the following manner.

A sprocket 515 (Fig. 23) is mounted upon the hub of the disc 482. A chain 516 passes over the sprocket 515 and over a sprocket 517 (Figs. 23, 30, and 32) which is keyed to the shaft 422. The chain 516 is maintained properly tightened by an idler sprocket 518 rotatably mounted on a stud 519 carried in a bracket 521 bolted to the side of the bearing 215.

The sizes of the four sprockets 467, 465, 515 and 517 are such as to impart a different rate of movement to the chain drives of the chains 466, 516 and by means of these drives the shaft 422 is driven at a slightly greater rate of rotation than the sleeve 421. This difference in rate of movement is taken up in the slip clutch 427 and is the manner in which the creeping action is obtained for the shaft 422 and the sleeve 421.

In the second time condition previously referred to, where a resistance against the feeding of the fork is prolonged beyond a single time cycle, supplemental devices are used for moving the fork 81 against the resistance so that it completes its forward stroke. This movement is at a slower speed. At such a time the fork is again actuated by the sleeve 421 without the timing device 233 being involved and without movement of either the cutter 75 or the feed chains 58. These supplemental devices involve the following parts.

The sprocket 517 (Fig. 23) may be an integral part of a gear 525 and this unit is held in lateral position upon the shaft 422 so that the sprocket is forced against an enlargement 526 formed on the shaft. A spacing sleeve 527 also located on the shaft has one end against the ball bearing unit 423 and its other end against the gear 525.

The shaft 422 is reduced at 528 and its end is threaded at 529. A lock nut 531 threadedly engaging this end clamps against a collar 532 and locks the movable part of the unit 423 with the shaft 422 and clamps the spacing sleeve 527 in position.

The gear 525 (Figs. 23 and 32) meshes with a gear 535 which is loosely mounted on the shaft 451 between the member 455 of the dog clutch and one of the bearings 452. This gear 535 while continually turning is used for effective work only during abnormal feeding conditions. It is used for the slow speed actuation of the fork 81 when it is completing its forward stroke after a pause.

It is adapted at such times to pick up and drive the element 455. The gear ratio between gears 525 and 535 on the one hand and between gears 439 and 442 on the other is such as to cause gear 442 to rotate substantially twice as fast as gear 535 and when both gear sets are normally operating this means that the element 443 is rotating about two revolutions to one rotation of the gear 535. The effect of this speed difference on the dog clutch 444 will now be explained.

The gear 535 is formed with a hub 536 (Figs. 23 and 25) which carries an arm 537 associated with a pawl and ratchet connection. The clutch element 455 is provided with ratchet teeth 538 which are located adjacent the end of the hub 536. The arm 537 carries a pin 541 on which a ratchet pawl 542 is loosely mounted. A spring 543 carried in an extension of the arm 537 presses against the pawl and effects engagement between the pawl and the ratchet.

The gear 535 carries its pawl 542 around at its regular slow rate of rotation and as long as normal feeding operations obtain the clutch element 455 moves its ratchet teeth 538 at substantially twice the speed. In other words the rapidly moving teeth continually snap by the spring pressed pawl and the rotation of the latter is without effect as far as the dog clutch 444 is concerned. It will be recalled that the element 443 drives the element 455 through the lugs 456 and 458 (Fig. 24) at such a time.

When there is sufficient resistance in the tunnel to prevent feeding of the fork 81, caused either by a crowding of fish or blocking of a large piece of fish in the tunnel, the dog clutch member 443 also stops turning. The shaft 422 is then the only moving part of the slip clutch 427 as previously described. Also the member 455 (Figs. 23 and 25) is then no longer driven from the member 443. There has been no interruption, however, to the relatively slow rotation of the gear 535 and the pawl 542 carried thereby now seats into a tooth 538 of the ratchet and advances the member 455 at the slower speed of rotation. The lug 458 (Fig. 24) immediately moves away from the now stationary lug 456 on the clutch member 443.

At the same time stopping of the feeding fork is accompanied by stopping of the ring 476 (Figs. 23 and 26). The moving block 481 of the timing device 233 then carries the cam roller 499 of the latch unit along the slot 501 so that the latch 495 is immediately disengaged from its shoulder 506 of the ring 505. The block 481 therefore stops rotating, resulting in bringing the operations of the cutter 75 and the feeding chains 58 to a standstill.

The slow movement of the clutch element 455 through the pawl and ratchet connection with the gear 535 is in no way affected by the throwing out of the timing device just described. In the event that the resistance against the feeding fork is at once removed and the jam in the tunnel relieved so that the fork 81 is no longer held against movement, the slip clutch 427 picks up the chain 414, as just described, and operates the various connections so that the fork resumes its movement.

The time required for the lug 458 to move from the lug 456 around to the lug 457 is the gage of time for one cycle. It is after this time cycle passes and with the timing unit 233 still disconnected that the slow rotation of the sleeve 421 takes place and through it the slow movement of the fork against the continued fish resistance as the fork completes its forward stroke. The lug 457 of the clutch element 443 now comes into play.

The element 455 moved by the slowly moving gear 535 through the pawl and ratchet connection now picks up the element 443, the lug 458 engaging and driving through the lug 457. This movement is transmitted back through the sleeve 421 and the friction clutch 427 and thence to the chain 414 and the feeding fork 81 which completes the forward stroke that was interrupted by the increased resistance against feeding.

As soon as the sleeve 421 begins its slow movement the ring 476 is correspondingly moved by the moving chain 466 and this, operating on the latch cam roller 499, as previously described, places the latch of the timing device 233 into position for engagement. Just as soon as connection is made, the fork, cutter and feeding chains start movement at the normal high speed. This connection is made when the fork reaches the end of the feeding stroke and should the resistance against feeding be relieved sooner the connection through the timing device would be sooner.

In the event of there still being too much resistance to the fork as it begins its next feeding stroke it will again momentarily stop sufficiently to disconnect the timing unit 233. The high speed movement following a slow feeding stroke quickly carries the lug 457 away from the lug 458 and sets the dog clutch for normal operation.

*Advancing fork instrumentalities*

The feeding of the fish mass after passing through the twisted section 95 of the tunnel 65 and after coming into the tunnel section 103 will now be described in detail. As has previously been mentioned the feeding of the fish through this section of the tunnel is accomplished by the feeding forks 105, 106.

The fork 105 extends through spaced slots or openings 601 (Fig. 16) formed in a vertically disposed rock shaft 602 located in the side wall of the tunnel section. This rock shaft operates in two spaced pockets 603 or seats formed in the tunnel wall, the space between seats on the interior of the tunnel being designated by the numeral 604, that on the outside being indicated at 605.

These spaces are utilized for clearance of the fork 105 during its lateral movement with the oscillating shaft 602. Besides this lateral movement the fork slides back and forth in its slots 601. These two kinds of movements effect the intermittent forward movement of the fish along the tunnel passage.

One cycle of these compound movements of the fork 105 may be fancifully divided into four sections or steps. The first step relates to pushing the fork into the tunnel through the slots 601 and through the fish mass. The forward entering ends of the fork prongs point back toward the tunnel 65 at such a time, as illustrated in Fig. 16.

In the second step the fork moves laterally with the oscillation of the shaft 602 and its inner end sweeps longitudinally of the tunnel and toward the discharge opening 109, the fish mass in front of the fork thus being advanced.

The third step in the cycle relates to withdrawing the fork from the fish mass (Fig. 15) and in the fourth step the fork is carried back or laterally moved to starting position by oscillation of the shaft 602 in the opposite direction.

The fork 105 (Figs. 16 and 17) is secured at its rear end 606 to a vertical shaft 607 which is carried in a boss 608 formed on the lower surface of a gear 609 secured to a short vertical shaft 611 which is supported from above in a bearing 612 formed in a bracket 613 bolted to the top wall of the flange 102 of the tunnel section 103.

The gear 609 is so supported on the shaft 611 and its boss 608 is so positioned below the end of the shaft 611 as to provide all of the actuating force necessary to effect the four step movements of the forks just described, the free oscillation of the shaft 602 assisting in these movements.

The gear 609 meshes with and is driven by a gear 621 which is mounted on a vertical shaft 622. Shaft 622 is associated with a spring friction clutch 623 which normally connects the gear 621 with the shaft 622. In the event of abnormal resistance to movement of the fork 105 the slip clutch 623 yields and permits turning of the shaft 622 without a corresponding movement of the gears 621, 609. This is the slip friction for the rear fork 105 previously referred to.

The shaft 622 turns freely in an elongated sleeve bearing 625 formed as an integral part of the housing 51. The lower end of the shaft 622 carries a sprocket 626 which is continually rotated by means of a chain 627 (Figs. 3 and 17) which not only passes over the sprocket 626 but also over a number of other sprockets.

Chain 627 passing from the sprocket 626 runs over a sprocket 631 mounted on a vertical stud 632 carried in the housing 51. It also passes over a sprocket 633 secured to the lower end of a shaft 634 journaled in a bearing 635 formed in the housing 51. The chain thence extends over a drive sprocket 637 mounted on a vertical shaft 638 carried in a bearing 639 formed in the housing 51 and in a bearing 641 formed in a bracket 642 (Figs. 3, 11, and 17) secured to the housing 51.

The chain 627 is maintained under a proper working tension by a tightener sprocket 643 (Fig. 3) mounted on a stud 644 carried in the housing 51. The tightener sprocket 643 is located about half way along the chain run joining the sprockets 626, 637 and this tightener sprocket completes the sprocket group for the chain 627.

The shaft 638 is reduced at its lower end as at 651, the shoulder of the upper part of the shaft resting upon a thrust washer 652 (Figs. 4, 11 and 17). The washer 652 rests upon the bearing 641 and this construction holds the shaft in proper working position within its bearing.

A gear 653 is keyed to the lower end 651 of the shaft 638 and is held in position by a bolt 654 threaded into the end of the shaft. A washer 655 is interposed between the head of the bolt 654 and the gear 653. Gear 653 meshes with and is driven by a large gear 656 which is keyed to the turret shaft 117.

The shaft 117 is normally rotated through a gear train connecting with the drive pulley shaft 263 but provision is made for disconnecting this driving train in the event of abnormal conditions which tend to hold the shaft 117 against rotation. The gear train referred to includes a pin clutch best illustrated in Figs. 4 and 12. A second gear 661 is loosely mounted on the shaft 117 directly beneath the gear 656 and the former gear operates directly with the pin clutch.

Gear 661 is provided with one or more pockets 662 into which one or more pins 663 are adapted to seat. A single pin and pocket is shown in the drawings. The pin 663 is slidably held in a disc 664 of the pin clutch which is formed with a hub 665 keyed to the lower end of the shaft 117.

The lower end of the pin 663 rests upon a vertically slidable collar 666 which is mounted upon the hub 665 of the disc. A spring 667 is located on the collar member 666 and its lower end is held by adjusting and lock nuts 668 which are threadedly secured to the end of the shaft 117.

During normal movement of the machine the disc 664 is connected with the gear 661 by the pin 663 and this gear then turns in unison with the shaft 117. During an obstruction to the shaft movement, the pin 663 is forced out of its seat 662, the spring 667 yielding to permit sliding movement of the collar 666. There is then no driving connection between the gear 661 and the shaft 117.

The gear 661 (Fig. 12) is continually driven by a pinion 675 mounted upon the lower end of a shaft 676 journaled in a bearing 677 formed in the housing 51. The shaft 676 also carries a bevel gear 678 which meshes with a bevel pinion 679 fixed to the shaft 257 adjacent the gear 261. In this manner the shaft 117 is driven from the pulley shaft 263.

The fork 106 (Figs. 16 and 18) has a similar movement to the fork 105 and a single cycle of its action may also be divided into four steps, these being similar to the movements of the other fork. The feeding travel or amplitude of movement of the fork 106, however, is considerably greater than that of the fork 105. This increased travel is required to sweep the fish mass between the tunnel walls 107, 108 and out through the discharge opening 109.

The prongs of the fork 106, like those of the fork 105, project through a vertically disposed rock shaft 685 and slide in slots 686 formed in the shaft. The shaft 685 is carried in two spaced pockets or seats 687 which are similar to the pockets 603 of the shaft 602. An inner space 688 and an outer space 689 are thus formed on opposite sides of the shaft 685 and provide clearances for the fork 106 when it moves laterally during oscillation of the shaft.

The pocket 687 is formed adjacent the outer cylindrical wall 691 of a segment 692 which is mounted for oscillation within an opening 693 formed in the side wall 108 of the tunnel section 103. The segment 692 is also formed with a top wall 695 and a bottom wall 696, the former being projected upwardly in a stem 697 which rotates back and forth in a vertical bore 698 formed in the top wall of the tunnel 103.

The bottom part 696 of the segment is mounted upon and keyed to a head 701 of a vertically disposed shaft 702 which is mounted in a bearing 703 formed in the bottom wall of the tunnel 103. The stem 697 is on the same vertical axis as the shaft 702 and the segment 692 moves back and forth on this axis, the cylindrical wall 691 of the segment maintaining a tight fit with the side wall of the tunnel and closing the opening 693.

Rocking movement of the segment 692 is effected through oscillation of the shaft 702 and for this purpose the latter is formed with a square end 704 (Figs. 15 and 18) on which an arm 705 is mounted. The arm 705 is slotted at its outer end and a block 706 located in the slot is connected by trunnions 707 to the arm.

A horizontally disposed bolt 708 having a head 709 passes loosely through the block and the bolt head confines a rubber cushion cylinder 711 on the bolt and against the block 706. A spring 712 also located on the bolt 708 is confined between the block 706 and a collar 713 pinned to the bolt. This spring together with the rubber cushion provides a yielding connection for the arm 705 which is swung back and forth on the axis of the shaft 702.

When the fork 106 meets with such resistance as to hold the arm 705 against movement, the bolt 708 which moves longitudinally in a certain manner, slides in the block 706. This prevents damage to the parts while allowing for the uninterrupted regular movement of the bolt 708. This movement will now be described.

The tail end of the bolt 708 is threadedly secured in a split bearing block 714 (Figs. 15 and 17) pivotally mounted on a stud 715 which is carried on the upper side of a head 716. The head 716 is securely fixed on the upper end of the shaft 634 and rests upon a bearing plate 717 bolted to the housing 51.

As the shaft and its head are rotated by operation of the chain 627 passing over its sprocket 633, as previously described, the stud 715 being carried around in a circular path of travel. The stud is mounted eccentrically to the axis of the shaft 634 and the bolt 708 carried by the stud acts as a connecting rod extending to the end of the arm 705. This circular movement of one end of the bolt 708 normally rocks the arm back and forth and imparts the desired rocking movement to the segment 692.

Projecting the prong ends of the fork 106 into the tunnel 103 and into the mass of fish constitutes the first step in the cycle of movement. Rocking of the segment 692 and the resulting forward sweep of the fork is the second step. After reaching the forward end of travel the forks are then withdrawn from the fish mass and this constitutes the third step. On the fourth step the segment is moved back on its reversed stroke and the fork is returned into its first position for a subsequent movement.

Insertion of the prongs of the fork into the fish mass and their reverse movement or withdrawal is effected by a cam. The rear end of the fork 106 (Figs. 16 and 18) is carried in a block 718. The fork is formed with a ridge or projection 719 which extends along its rear edge and is engaged within a notch 720 cut in the block. A clamping plate 721 is bolted to the block 718 and holds the fork in rigid position in the block. Block 718 carries a pivot pin 722 on which is mounted one end of a lever 723, the block being cut away in its central section to provide clearance for the lever.

The opposite end of the lever 723 is pivotally mounted on a pin 724 carried in a bracket 725 projecting outwardly from the front tunnel wall. A connecting rod 726 is pivotally secured at 727 to the lever and its opposite end is pivoted at 728 to one end of an arm 729 clamped to the upper square end 731 of a vertical rock shaft 732 (Figs. 15 and 17) mounted in a bearing boss 733 formed in the housing 51.

The lower end of the shaft 732 carries an arm 734 which holds a pin 735 rotatably supporting a cam roller 736. The roller 736 operates within a groove 737 formed in the upper surface of a cam 738 keyed to the shaft 622. This is the cam control for the in and out movement of the fork 106 previously mentioned and rocking movement of the arm 734 through the described connections imparting a like movement to the lever 723 which in turn moves the fork as described.

*Fish charge segregating*

When the segregating knife 121 passes down across the discharge opening 109 and through the fish mass extending into a passing measuring chamber 115, it moves through a slot 751 formed in the top wall of the tunnel section 103 (Figs. 4 and 20) alongside of the outer wall of the turret 116. The knife 121 is bolted to an enlarged end 752 of a strap 753 which has sliding movement within a guideway 754 formed in a bracket 755 mounted on the top wall of the tunnel.

The strap 753 is pivotally engaged at 756 to a connecting rod 757 which pivotally connects at 758 to the outer end of an arm 759 (Figs. 1, 4, and 5). The arm 759 is keyed on a rock shaft 761 which is mounted in bearings 762 formed in a gear casing 763.

The gear casing 763 is located above the upper end of the shaft 117 and is mounted upon a horizontal head or extension 764 of a column 765 mounted at one end of the machine and carried by the housing 51. The casing 763 is also tied into a compact unit with the feed box casing 62 by a tubular connecting frame 766 bolted at 767 to the gear casing 763 and at 768 to the casing 62. The extension 764 is provided with a chamber 769 (Figs. 4 and 6) in which the upper end of the shaft 117 extends, this chamber being closed by the superimposed gear casing 763.

The shaft 761 (Figs. 4 and 5) also carries an arm 771 which is located entirely within the gear casing 763 and which supports a pin 772 at its free end. A cam roller 773 is rotatably mounted on the pin and operates within a groove 774 formed in a barrel cam 775 mounted on a vertical shaft 776 journaled in a bearing 777 formed in the bottom of the gear casing 763 and in a bearing 778 formed in a cover plate 779 resting upon and bolted to the gear casing.

The cam 775 and shaft 776 are revolved from the shaft 117 by a gear train. Shaft 776 carries a pinion 781 which meshes with a gear 782 mounted on a vertical stub shaft 783 (Figs. 4 and 6) held in rotatable position by and adjacent to the bearing 762 of the gear casing. A bolt 784 (see also Fig. 5) passing through a washer and threadedly secured in the upper end of the shaft 783 retains the shaft in working position.

The shaft 783 also carries a pinion 785 which meshes with a gear 786 keyed to the upper end of the shaft 117. It will be understood that the shafts 117 and 776 are out of vertical alignment, as a comparison between Figs. 5 and 6 will show, and the shaft 783 thus acts as a connecting link in the gear train. As long as shaft 117 rotates, the cam 775 moves correspondingly and operates upon the cam roller 773 which acts through the described connections to move the knife 121 up and down in proper time.

The forward ends of walls 107, 108 of the tunnel 103 are laterally extended into an end wall 787 (Figs. 9, 16, and 19) curved to evenly engage the turret 116. At this end the tunnel frame is indirectly carried by the housing 51 as best shown in Fig. 20. The bottom wall of the tunnel is extended down in a wall 788 which is adjustably secured to a vertical wall 789 projecting upwardly from a base plate 791 which rests upon the housing 51.

The floor of the tunnel 103 just above its wall extension 788 is slotted at 792 (Figs. 18, 19, and 20), this slot extending rearwardly from the floor opening 123. The backing-up plate 122 for the knife 121 is located in this slot. A protecting cover plate 793 is secured to the tunnel floor just above the backing-up plate, its upper surface being flush with the floor of the tunnel and insuring a smooth passageway for the fish at this position. The cover plate 793 does not extend across the opening 123 in the tunnel floor.

An upwardly projecting edge 794 formed on the backing-up plate 122 normally is just about touching the outer peripheral wall of the turret 116, this position being illustrated in Fig. 20. When in such position the backing-up plate closes the floor opening 123. When moved into the position illustrated in Fig. 21 the opening is partially uncovered and the lower cutting edge of the knife enters and fills the crack. This partial uncovering of the floor opening takes place as the cutting knife 121 completes its segregation of the fish charge. Shifting of the position of the backing-up plate 122 is controlled by spring and cam actions as will now be described.

The upper eccentric end 795 of a headed pin 796 (Figs. 17 and 20) loosely fits in a vertical bore 797 formed in the plate 122, the shank of the pin extending through and having clearance in a slot 798 in the tunnel floor. The lower end of this pin is clamped as at 799 in the end of a lever 801. The pin 796 may be partially rotated in its seat to adjust the relative position between its eccentric end 795 and the lever 801, this also closely adjusting the position of the plate 122.

Lever 801 is mounted for rocking movement on a short shaft 802 which is held suspended in a bracket 803 (Figs. 15 and 17) bolted to the tunnel wall. The shaft 802 is held in place by a bolt 804 which is threadedly engaged in the upper end of the shaft, its head resting upon the bracket 803.

Two aligned upper and lower levers 805, 806 (Figs. 16, 17, and 19) are jointly and individually used to control the position of the arm 801 and through it the plate 122. The top lever 805 carries an extension arm 807 which is bent downwardly and along one side of the lever 801. This arm is recessed at 808 and a spring 809 is located within the recess, one end of the spring resting against the lever 801 and the opposite end against a button held in the recess by an adjusting bolt 811.

The lower lever 806 is provided with an arm 812 which is bent upwardly and which carries a setscrew 813 located on the opposite side of the lever and in alignment with the spring 809. Normally the lever 801 is held against the end of the setscrew 813 under the yielding action of the spring. This means that as the lever 806 shifts its setscrew the spring of the lever 805 tends to hold the lever 801 with the lever 806.

The backing-up plate 122 is moved back a short distance from its tunnel closing position in Fig. 20 as the descending knife 121 approaches so that it will not be struck with the cutting edge of the knife. This is a quick movement bringing the plate into the position shown in Fig. 21. To effect this withdrawal of the plate, the lever 801 is shifted by the conjoint action of the levers 805 and 806, all of the levers maintaining their relative positions and moving as a unit.

The controlling cams for the levers 805, 806 are loosely mounted on the vertical shaft 622 (Figs. 16 and 17) and turn with the gear 621. The upper lever 805 carries a cam roller 815 which operates on the wall of a peripheral cam 816 which is bolted to the hub of the gear 621 and which normally turns with the shaft 622. In like manner the lever 806 carries a cam roller 817 which similarly engages a second peripheral cam 818 mounted below and secured to the cam 816. The two cams move the levers 805, 806 in unison during this initial backing-up of the plate 122.

The cam rollers 815, 817 (Figs. 15, 16, and 17) are kept in engagement with the cam surfaces 816, 818 by spring action and for this purpose upper lever 805 is formed with a depending lug 819 which extends alongside of a boss 821 formed in the lower lever 806. A light spring 822 is carried in the boss 821 and engages the lug 819.

On the outside of the lug 819 directly opposite the spring 822 there is located a sliding spring barrel 825 which moves within a boss 826 formed on an arm 827 projecting downwardly and outwardly from the bracket 803. A spring 828 is located within the spring barrel 825, one end of the spring being held in an adjusted position by a nut 829 threadedly engaged in the end of the boss 826.

This boss is split on one side adjacent the nut 829 and a bolt 831, passing through the split sections, clamps the nut 829 in adjusted position. The spring 828 is much stronger than the spring 822 and its crowding action against the lug 819 of the levers holds both levers in position so that their cam rollers will engage their respective cams. Spring 828 is also used for another purpose, that of holding the backing-up plate 122 under relatively heavy spring pressure when it is closing off the tunnel floor opening 123.

When the descending knife 121 reaches the position shown in Fig. 21 its lower inclined face adjacent its cutting edge engages with the edge 794 of the pulled back plate 122. From this engaged position and during the continued descent of the knife and until it reaches the end of its stroke this inclined surface slides across the plate edge and moves back the backing-up plate. During this movement, however, action of the relatively heavy spring 828 is nullified and the plate does not need to be moved against such pressure. This is accomplished as follows:

The cam 816 moves the lever 805 at such time and by means of the projection 819 depresses the spring barrel 825 and the spring 828. Lever 806 is then held only with the light spring 822. The lever 805 in moving back shifts its arm 807 and carries the spring 809 with it. This spring expands sufficiently to still hold against the lever 801.

During movement of the plate 122 by action of the descending knife 121 and up until its lowermost position (Fig. 22) is reached, the resulting movement of the arm 801 is made against the expanded and relatively light acting spring 809. It will be observed that throughout this time the floor opening 123 is not uncovered any more than is necessary for the passage of the knife and fish particles at this place are retained within the tunnel.

Some water may be entrapped in the tunnel as the fish mass moves along and this drains out through the opening 123. There will be further description regarding this feature when the water cleaning system is considered in the pages that follow.

*Fish measuring chambers and fish and can carrier turrets*

During the can filling operation the measuring chambers 115 which are carried by the turret 116 are entirely enclosed. This turret is formed with a cylindrical wall 832 (Figs. 4 and 9) and the measuring chambers 115 are located outside of this wall. A fixed jaw or mold block 833 is associated with each chamber and is secured to the wall 832. This fixed block is formed with a concave face 834, the curvature of which corresponds to a cylinder slightly smaller in diameter than the inside diameter of the can 125 into which the segregated fish charge is to be filled.

Each chamber also carries a movable jaw or mold 835 and the latter is formed with a concave face 836 which is oppositely disposed to the face 834 of the fixed mold and which is of the same curvature. When companionate fixed and movable jaws are in closed position their concave faces cooperate to provide a substantial cylindrical mold for the fish contained within the measuring chamber.

The jaw 835 moves toward and away from the fixed jaw 833 along a circular path, this path being a true arc, the jaw keeping close to the wall 832 during such movement. A tongue and groove trackway connection 837 (Fig. 46) is formed between the jaw and the engaged wall of the turret 116 at the top of the jaw. A tongue and groove connection 838 is also provided for the bottom part of the mold and this will be hereinafter more fully described.

Each jaw 835 carries a vertical pin 839, the jaw being recessed at 840 and a square sectioned block 841 (Figs. 9, 16, and 46) is located in the recess. The block surrounds the pin 839. Each block 841 is loosely engaged by the slotted end of an arm 842 which extends through an opening cut in the wall 832 adjacent each measuring chamber.

Each arm 842 is clamped on the squared, lower end of a vertical rock shaft 843 which is journaled in a lower bearing formed in the turret 116 and in an upper bearing formed in a spider frame 844 (Figs. 4, 7, and 46) which is mounted on the shaft 117 and is bolted to and turns with the turret 116.

An arm 845 is secured to the squared, upper end of the shaft 843 and each arm carries a cam roller 846 which moves within a cam groove 847 formed in the lower face of a stationary cam 848 which surrounds the shaft 117 and is located directly above the spider frame 844.

This cam 848 is held in stationary position by connection with an upper stationary cam 849 (Fig. 4) which is also mounted on the shaft 117 and is held against movement by engagement with the column extension 764.

The molds 833, 835 are formed with outer curved side walls which are arcs struck from the center of the shaft 117 and together form the outer cylindrical wall of the turret. The curved face or surface of the end tunnel wall 787 fits closely these jaw surfaces and confines each measuring chamber 115 at its outer side as the chamber is carried adjacent the mouth or discharge opening 109 of the tunnel.

Directly opposite the wall 787 the revolving turret is confined within a curved wall 851 formed on the inner face of a block 852 which is held on the inside of the column 765. The intervening lateral space between the walls 787, 851 on one side is closed by a circular wall 853 formed in a side plate 854 which is hinged on vertical pins 855 carried in the block 852. This permits the swinging of the plate 854 away from turret confining position when it is desirable to gain access to the measuring chambers and to the outside peripheral wall of the turret.

The plate 854 is held in closed position by a pair of clamps, located adjacent its ends and by means of which the circular wall 853 is caused to properly cooperate with the turret so that the fish charge in each measuring chamber 115 is held in and shaped between the molds 833, 835. These molds when in closed position (as illustrated in the upper part of Fig. 9) do not come together along their outer side and the cylindrical charge of fish in the chamber is flat on its outer side where it slides along the surface 853.

One plate clamp comprises an eye bolt 856 which is pivoted on a pin 857 carried in the tunnel frame just back of the wall 848. The plate 854 on this side is slotted at 858 and this permits swinging of the eye bolt around into clamping position where a clamping nut 859, threadedly engaging the end of the bolt, holds the plate in position. In a similar manner an eye bolt 861 is pivotally mounted on the hinge pin 855 and a lock nut 862 threadedly secured to the bolt clamps against a part of the plate when it is in closed position holding it in position along that side.

Across from the plate 854 a second side plate 865 is pivotally mounted on a pin 866 held in the block 852. Plate 865 may also be swung out of the way to permit access to the outside of the turret and to the measuring chambers. This plate when moved into closed position is held by a locking pin 867 carried in lugs 868 (Figs. 1 and 9) formed in the end of the tunnel frame 787.

The inner turret wall 832 (Fig. 9) provides the enclosing inner side wall for each measuring chamber 115. It will be observed that the confining wall 853 of the side plate 854 fits the turret closer than the inner wall of the side plate 865. The measuring chambers 115 are empty when passing adjacent the wall of the side plate 865 as will be more fully explained and accordingly no confining or shaping function is present as with the other plate. This wall 865 only encloses the turret against dirt and foreign matter.

The top wall or ceiling for a part of the measuring chambers 115 when in open position is formed by a horizontal circular plate 871 (Figs. 4, 7, and 20) which is an integral part of the turret 116. This circular top plate is cut through vertically with apertures 872, there being one aperture communicating with each measuring chamber. Each aperture 872 is just large enough to admit the plunger 155. At the time fish is entering an open measuring chamber 115 the under surface of its raised plunger 155 joins with the adjacent surface of the plate 871 to form the ceiling for the chamber as shown in part on the left of Fig. 4.

The floor of each measuring chamber during its filling time is formed by a three layer arrangement, including a stationary plate 873 (Figs. 14 and 20) secured at 874 to the tunnel 103, an upper plate 875 (see also Fig. 46) and a lower plate 876. The two latter plates are carried with the turret 116. The stationary plate extends in between the two turret plates and holds this position while the turret plates slide along with the turret.

The plate 873 blocks off an opening 877 cut in the lower plate 876 within each chamber, and an opening 878 cut in the periphery of the upper plate 875 in vertical alignment with each opening 877. These two aligned openings constitute discharge openings for each measuring chamber and the fish charge is delivered into a can through them, as will be hereinafter more fully described.

The stationary plate 873 is a segment of a ring and only extends on the sides of the tunnel discharge opening 109 far enough along the path of travel of each measuring chamber to support the fish extending down into the opening 878 while it is being formed by the jaws 833, 835. During this passage of a measuring chamber the fish therein slide along the upper surface of the stationary plate.

*Empty can feeding device*

The can feed chains 126 for bringing the cans into the machine operate at the entrance end over idler sprockets 901 (Fig. 2) mounted on a horizontal shaft 902 carried in the table 127. These chains 126, at the other end and adjacent the starwheel 141, operate over sprockets 904 (Figs. 9, 42, and 43) which are keyed to a horizontal shaft 905 journaled in bearings 906 formed in the table 127.

The shaft 905 carries a bevel gear 907 which meshes with a similar gear 908 mounted on a vertical shaft 909. This shaft 909 is the shaft that carries the starwheel 141, the latter moving with the shaft. Shaft 909 is journaled in a bearing 911 formed in the housing 51.

The shaft 909 is driven from the shaft 638, a sprocket 912 (Figs. 3 and 43) being secured to the lower end of the shaft 909 for this purpose. A chain 913 operates over the sprocket 912 and provides a driving connection from the shaft 638. It effects such a connection by passing over a smaller sprocket 914 (see also Fig. 17) keyed to the shaft 638. In this way the can conveying chains 126 are properly moved to bring the cans 125 into the starwheel 141, the drive also rotating the starwheel in proper synchronism.

During the travel of the cans with the chains 126 each can receives its charge of salt from the salter 133 and is thereafter brought into proper time relation with the machine by the timing screw member 135. Detailed description of the salter will not be given until after the timing screw is more fully considered.

The screw member 135 is mounted on a shaft 921 (Figs. 1 and 15) which is located in a vertical plane parallel to and just to one side of the chains 126. One end of the shaft is higher than the other, as best illustrated in Fig. 1, this mounting locating the spiral thread 136 of the screw for most efficient work.

The upper end of this shaft is journaled in a bracket 922 which is mounted upon the table 127. Its lower end is journaled in bearings 923 formed in a yoke bracket 924 also mounted on the table. Shaft 921 carries a bevel gear 925 which meshes with a bevel gear 926 carried by a stub shaft 927 journaled in the bracket 924.

The shaft 927 also carries a sprocket 928 over which a chain 929 operates, the chain also passing over a sprocket 931 (Figs. 1, 9, 42, and 43) keyed to the end of the shaft 905. It is by means of these sprocket, chain, shaft and gear connections that the timing screw 135 is properly rotated to space and time the cans and slide them forward over the chains 126 and into the starwheel 141.

*Salt feed to empty can*

The salting device 133 is best shown in Figs. 32 and 45 and reference should now be had to those drawings. The upper part of the supporting bracket 134 is hollowed out as at 932 and the hopper, which holds the salt and which is designated by the numeral 933, rests on the bracket. The bottom of the hopper is centrally apertured at 934 and a block 935 extends into the opening.

The block 935 forms a bottom floor plate for the hopper and extends out over the path of travel of the cans 125 on the chains 126. In this projecting section is formed a discharge opening 936 through which the salt falls into the open passing cans.

A charge of salt of a predetermined amount is carried to and above the opening 936 by a rotating measuring disc 937 formed with peripheral semi-circular pockets 938. Each pocket is completely filled as it moves around in the salt within the hopper and the pocket is leveled off and an exact amount of salt is trapped therein when the disc 937 passes under a shoulder 939 formed in the inside wall of the hopper.

The filled pocket is then brought adjacent a spring held scraper 940 mounted on the bottom plate 935 just above the discharge opening 936. As the pocket passes over the opening the scraper scrapes the salt away from the walls of the pocket and all of that charge of salt falls into the can beneath.

The disc 937 is mounted upon the upper end of a vertical shaft 941 which extends through and has bearing in the bracket 134. This shaft at its lower end carries a gear 942 which meshes with a pinion 943 which is mounted on a vertical shaft 944. The pinion 943 connects with the shaft 944 through a spring held friction device 945 which is enclosed within a housing 946 mounted on the housing 51.

Shaft 944 is journaled in a bearing 947 formed in the housing 51 and at its lower end carries a gear 948 which meshes with a gear 949. The gear 949 is secured to and is rotated by the shaft 634 (see Fig. 17). This gear 949 is preferably an integral part of the sprocket 633 which is the driving element for the shaft 634.

Can support unit

Figure 7:
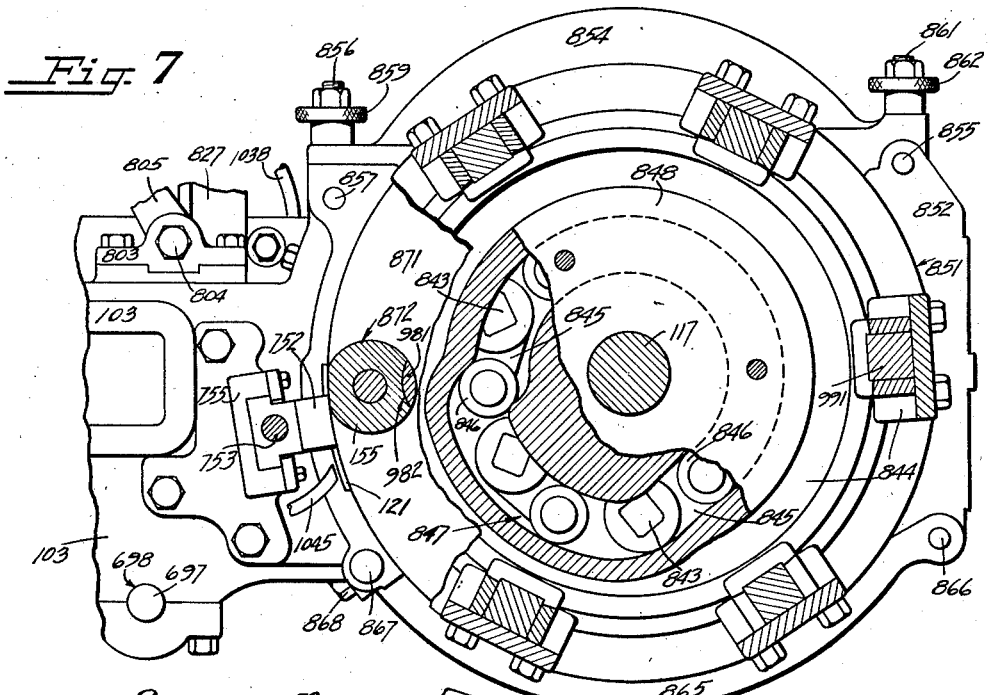
Figure 8:
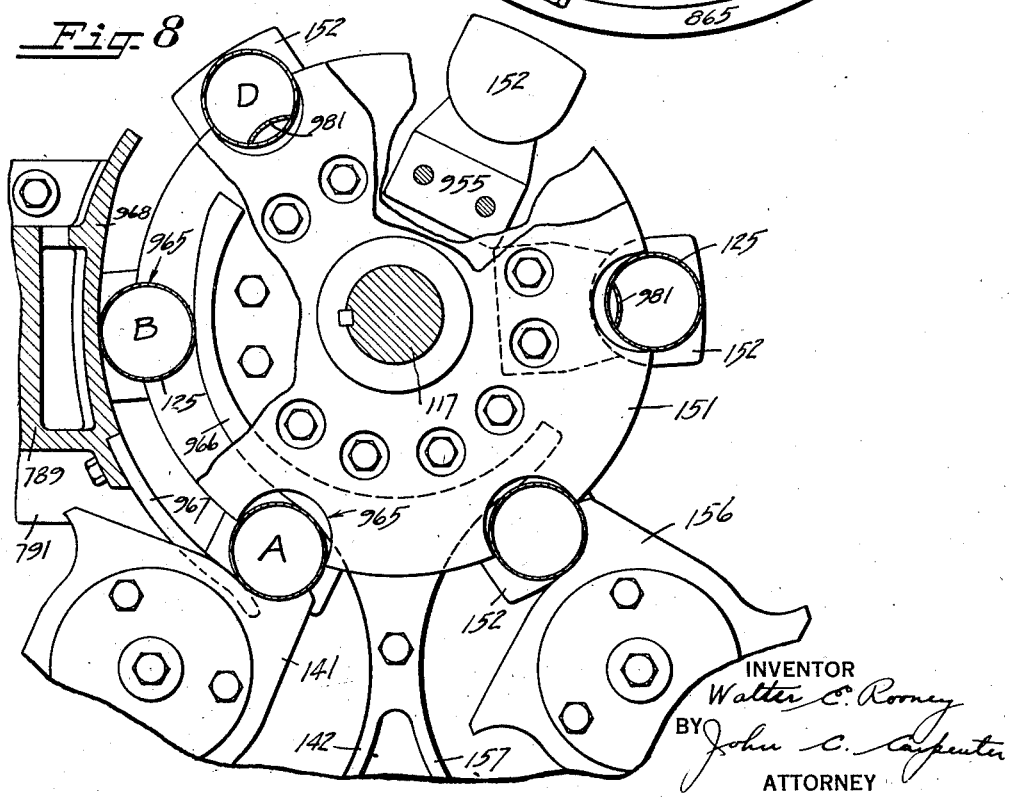

Each can support unit 152 is formed with a shaft 954 which has vertical movement within a bracket 955 (Figs. 4 and 8). Each bracket is bolted to the under side of the turret 151. The brackets 955 are thus carried around with the turret and during such travel each bracket receives a can 125, lifts it into filling position and then returns it to lowered position for discharge.

The shaft 117 which carries the turret is journaled at its upper end in a bearing 956 formed in the column extension 764 and at its lower end in a bearing 957 formed in the housing 51. A thrust bearing 958 rests upon the bearing 957 and supports the shaft in its working position. This construction maintains the turret 151 and the support units 152 in proper vertical position.

Each support shaft 954 at its lower end carries a pin 961 on which a cam roller 962 is rotatably mounted. As the turret 151 rotates and carries its support units 152 in their circular path of travel each associated roller 962 traverses a cam groove 963 formed in a stationary cam 964 carried by the housing 51 and keyed on the bearing 957. This cam track raises and lowers the support units 152 and the superimposed cans 125 as described.

The starwheel 141 in moving a can 125 on to a support unit 152, enters it partially into a semicircular pocket 965 (Figs. 4 and 8) formed in the peripheral edges of spaced horizontal sections composing the turret 151. The can is prevented from fully seating within the pocket 965 at this time by a circular extension 966 formed as a part of the guide rail 142. As the can begins to leave the starwheel 141, this position being indicated by the letter A in Fig. 8, it is also guided by a rail 967 which cooperates with the section 966.

The rail 967 is bolted to a circular wall 968 (see also Fig. 20) which is formed as a part of the wall 789 of the base plate 791. It is while the can is passing between the guiding members 966, 968 that the measuring chamber 115 directly above is passing the discharge opening 109 of the tunnel.

The extension rail 966 is cut back or flattened adjacent its center and the wall 968 directly opposite is closer to the center of the shaft 117. The can when in the center of this flattened part, this position being indicated by the letter B in Fig. 8, is nearer to the center of the shaft 117 than at any other time. It is then fully within the turret pocket 965 (see Fig. 20).

The can in such position is out of alignment or at one side of a vertical plane passing through the knife 121 and is to one side of the tunnel floor opening 123. The upper edge of the can is under a deflector plate 969 mounted upon the wall 968. This plate acts as a drain and its upper surface slopes from a high point just inside of the peripheral edge of the fish turret 116.

Any water or drip of any kind which may pass through the opening 123 as the knife 121 descends is caught on the inclined surface of the plate 969 and is deflected in between the walls 789 and 968 and is prevented from passing into the open top of the can. Provision is made for flushing some of the machine parts from this place and this drain assists in keeping water out of the can. This will be again referred to later.

The can 125 is moved from position B (Fig. 14) into a position C and during its arcuate travel to this position it is pushed out radially of the turret pocket 965 by the guiding elements 966, 968 (Fig. 8). When it reaches the station C the can is again only in partially inserted position within the turret pocket 965 and is again in vertical alignment beneath the openings 877, 878 of the respective plates 876, 875.

One corner of the plate 873 (Fig. 14) is cut away in a circular wall 971, this being at the station C, and when the can is brought beneath this cut away corner the charge of fish within the measuring chamber directly above is no longer supported by the plate 873 and is ready to be pushed into the can.

At station C the can is also in vertical position for filling, its support unit 152 at such time being in raised position, its cam roller 962 having been lifted by the cam 964. The upper mouth of the can is now just below the lower plate 876 of the turret 116.

It will be observed, by reference to Figs. 9 and 20, that the outer face of the turret wall 832 within each measuring chamber 115 is vertically grooved to provide a curved wall 979 which joins the wall 834 of the fixed jaw 833. A curved vent blade 981 is disposed in each measuring chamber and is adjacent the curved and grooved wall as shown. It is because of the presence of this blade that the fish charge within the chamber is not continuously cylindrical along its inner side. This vent blade assists in the can filling operation and will be more fully described in connection with the description of that operation which now follows.

Can filling

The first step in the can filling operation is the insertion of the vent blade 981 into the can. This blade is shown in the can at station D (Fig. 4) and when so positioned holds the can in its turret pocket and provides an escape for air within the can as the fish charge moves in place.

A blade 981 is directly associated with each plunger 155 being mounted alongside of the plunger and having sliding movement within a groove 982 (Figs. 4 and 7) cut in the plunger wall. This blade remains in lowered position in the can while the fish is being forced downwardly by the plunger 155. It is withdrawn from the can just prior to the plunger reaching its lowermost position.

Each vent blade 981 is controlled in its movement by the plunger 155 in advance of the plunger in which it slides. Each blade is mounted on the end of an arm 985 (Figs. 4 and 9) the opposite end of the arm being clamped to a vertical slide shaft 991 which carries the adjacent plunger just ahead.

Each plunger 155 is carried on the lower end of its shaft 991 and the latter has vertical movement within the spider frame 844 (see also Fig. 7) mounted on the shaft 117 and secured to the upper part of the turret 116 as previously described. Each shaft 991 carries a pin 993 on which a cam roller 994 is mounted, the roller traversing a cam track 995 of the stationary cam 849. The cam track 995 acts upon the cam roller to provide the proper vertical movemnt for the plungers 155.

Each shaft 991 is preferably rectangular in cross section, thus preventing rotation during its vertical movement. A clamping block 997 is bolted to the arm 985 to provide a solid connection between the arm and the shaft.

Each descending shaft 991 not only moves its plunger 155 downwardly through the measuring chamber 115 to force its fish charge into a positioned can but also moves the arm 985 associated with the adjacent plunger just behind. The vent blade 981 in the succeeding chamber is thereby lowered.

After a certain fish charge has been forced into its can its vent blade, being controlled by the plunger ahead, lifts out of the can before its plunger is lifted. This insures that each can is freed of its vent blade prior to the lifting of its plunger from the upper surface of the fish charge then in the can.

A small blade 998 (Figs. 4 and 20) is secured adjacent the bottom edge of the turret wall 832 opposite each vent blade 981 and extends into the concave side of the latter. This holds the vent blade in correct alignment and also acts as a scraper to dislodge any fish particles which may be brought up from the can with the ascending vent blade.

Filled can discharge

After the can has been filled with fish and both vent blade and plunger have been raised, the can is lowered to the level of the table 127. It then passes adjacent the rotating starwheel 156 (Figs. 8 and 9). The starwheel finger then sweeps the can from the support unit and again moves it over the table 127.

Starwheel 156 is mounted upon a vertical shaft 1000 (Figs. 11 and 42) journaled in a bearing 1001 formed in the table 127 and in a bearing 1002 formed in the housing 51. The shaft 1000 adjacent its lower end, carries a bevel gear 1003 which is keyed to the shaft and which meshes with a gear 1004 held by a key on one end of a horizontal shaft 1005 journaled in bearings 1006 formed in the table 127.

The opposite end of the shaft 1005 carries a bevel gear 1007 which meshes with the gear 908 on the other starwheel shaft 909. By means of this connection the shaft 1000 is constantly rotated in unison with the rotating shaft 909 of the starwheel 141.

After a filled can 125 is carried around by the starwheel 156 (Fig. 9) and along the guide rail members 157, 158 and is positioned upon the discharge chains 161 it is carried out of the machine. Each chain 161 operates over an idler sprocket 1011 (Figs. 10 and 42) which is mounted on a short shaft 1012 carried in bearings 1013 formed in a side wall of the table 127.

The chains 161 at the forward end of the table 127 pass over drive sprockets 1014 which are mounted upon and secured to a drive shaft 1015 journaled in bearings 1016 formed in the table 127. The shaft 1015 carries a bevel gear 1017 which meshes with a similar gear 1018 carried on a horizontal shaft 1019 journaled in bearings 1021 formed in the table 127.

The opposite end of the shaft 1019 carries a bevel gear 1022 which meshes with and receives rotation from the gear 1003. The discharge chains 161 are in this way positively driven to carry the filled cans out of the machine, this movement being in synchronism with the rotation of the discharge starwheel 156.

Water flushing system

It is contemplated to provide the apparatus with means for leading a cleaning fluid such as water to various places where the fish pass as through chambers, tunnels, etc., or to knives or cutting parts which continually contact the fish. This keeps the parts clean and increases the efficiency of the machine as well as expedites the proper movement of the fish in its passage to a can.

It will be understood that the cleaning water may be led to and discharged at any desirable position and the disclosure in the drawings is intended to show some ways for such fluid distribution merely as examples of what can be done in this line. It is not intended to show a complete system for a fish machine.

The flushing system comprises a water manifold 1025 (Fig. 1) provided with lugs 1026 which are bolted to the under part of the tubular frame 766. It is from this manifold that the various distributing pipes lead to the position desired. Water is supplied to the manifold 1025 by a supply pipe 1027. Each distributing pipe preferably contains a control valve so that the required amount of water in each pipe line may be independently controlled. Such valves permit shutting off of the water at any particular point of distribution.

It is desirable that water be supplied to the disc cutter 75 and for this purpose the first distributing line is shown as a pipe 1031 (Figs. 1, 30, and 33) which connects at its upper end, through a valve 1032, into the manifold 1025 and at its lower end into the cutter housing 76. The lower end of the pipe passes through the wall 343 of the housing and water dripping or flowing from the pipe washes away any fish particles which may lodge between the walls 341, 342 of the housing, this water also cleaning the cutter 75.

A second pipe 1035 (Figs. 1, 15, and 44), having a valve 1036 connects into the manifold, its lower end terminating adjacent the upper prong of the fork 105. Water flowing from this pipe washes off the fork prongs, thus cleaning them of any fish particles.

A third pipe 1038 (Figs. 1, 20, 21, 22, and 44) leading from the manifold 1025 and having a control valve 1039 terminates at a position beneath the opening 123 at the end of the tunnel 103. Water discharging from the end of the pipe 1038 sprays through the opening, washing out any ragged fish particles brought down by the descending knife 121. It also washes against the cutting edge of the knife as well as the forward edge of the backing up plate 122, thus insuring clean parts at this position.

The fourth pipe disclosed in the drawings is designated by the numeral 1045 (Figs. 1, 5, 6, 7, and 44) and this pipe connects with the manifold through a control valve 1046. The end of the pipe is located just back of the knife 121 and water is projected against its curved wall. This washes the knife as it raises out of the fish mass following the severing operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fish canning machine, the combination of a feeding tunnel, an intermittently movable carrier for advancing fish into the entrance end of said tunnel, a cutter adapted for operation transversely of the line of travel of said carrier during its rest period to cut the fish into can lengths, and a presser device for holding said fish in said tunnel entrance during said cutting.

2. In a fish canning machine, the combination of a feeding tunnel having a restricted discharge opening, an intermittently movable carrier for advancing fish into the entrance end of said tunnel, a cutter adapted for operation transversely of the line of travel of said carrier during its rest period to cut the fish into can lengths, a presser device for holding said fish in said tunnel entrance during said cutting, and a feeding fork for transferring each cut length of fish from said tunnel entrance toward its discharge opening.

3. In a fish canning machine, the combination of a feeding tunnel, an intermittently movable carrier for advancing fish into the entrance end of said tunnel, a cutter adapted for operation transversely of the line of travel of said carrier during its rest period to cut the fish into can lengths, a feeding fork for transferring the fish from said tunnel entrance after cutting, and means for imparting a lifting backward movement to said feeding fork for clearing said fish during cutting and for lowering said fork in behind said cut fish and thence advancing it forward to effect said transfer.

4. In a fish canning machine, the combination of a feeding tunnel, an intermittently movable carrier for advancing fish into the entrance end of said tunnel, a cutter adapted for operation transversely of the line of travel of said carrier during its rest period to cut the fish into can lengths, a feeding fork for transferring the fish from said tunnel entrance after cutting, means for imparting a lifting, backward movement to said feeding fork for clearing said fish during cutting and for lowering said fork in behind said cut fish and thence advancing it forward to effect said transfer, and yielding means operable by an abnormal resistance of said fish against the feeding operations of said feeding fork for preventing its feeding.

5. In a fish canning machine, the combination of a feeding tunnel, an intermittently movable carrier for advancing fish into the entrance end of said tunnel, a feeding fork movable parallel with the bottom of the tunnel for moving fish along said tunnel in one direction, means for moving said fork back and forth longitudinally of said tunnel in timed relation to the movement of said intermittently movable carrier, and separate means for lowering and raising the forward end of said fork to respectively engage said fish on its forward fish feeding stroke and to disengage and clear said fish on its backward stroke.

6. In a fish canning machine, the combination of a feeding tunnel, an intermittently movable carrier arranged transversely of said tunnel for advancing fish into the entrance end thereof, a feeding fork movable along the bottom of the tunnel for moving fish along said tunnel in one direction, a swinging arm pivotally supporting said feeding fork, means for moving said arm back and forth to move said fork longitudinally of said tunnel, and cam means for lowering and raising the forward end of said fork by rocking it on its pivotal connection with said arm to respectively engage said fish on its forward fish feeding stroke and to disengage and clear said fish on its backward stroke.

7. In a fish canning machine, the combination of a feeding tunnel having a restricted discharge opening, a feeding fork for moving cut fish along said tunnel toward said tunnel opening, advancing fork instrumentalities operating in said tunnel for receiving said cut fish from said feeding fork and for forcing it through said tunnel opening, means for moving said fork back and forth longitudinally of said tunnel, separate means for lowering and raising the forward end of said fork to respectively engage said fish on its forward fish feeding stroke and to disengage and clear said fish on its backward stroke, and means for operating said instrumentalities and said feeding fork to effect uniform fish travel through said tunnel, and fish-feeding means at the inner side of said restricted opening.

8. In a fish canning machine, the combination of a feeding tunnel, a feeding fork for moving cut fish along said tunnel, yielding means for preventing fish feeding by said fork operable by an abnormal resistance of said fish opposing the feeding operations, and means for positively moving said fork on a feeding stroke following one cycle of inactivity regardless of the fish resistance in said tunnel.

9. In a fish canning machine, the combination of a feeding tunnel having a discharge opening at one end, instrumentalities for moving fish out of said discharge opening, a feeding fork for moving fish along said tunnel and into said instrumentalities, actuating means for said feeding fork for normally moving it at substantially the same fish feeding speed as said instrumentalities, and means for moving said fork at a slower fish feeding speed than said instrumentalities when the fish crowd in said tunnel in excessive amounts and offer a predetermined resistance against feeding.

10. In a fish canning machine, the combination of a feeding tunnel having a discharge opening at one end, instrumentalities for moving fish out of said discharge opening, a feeding fork for moving fish along said tunnel and into said instrumentalities, driving means for operating said instrumentalities and said feeding fork at normal speeds to effect substantially uniform fish movement, and auxiliary fork actuating means for stopping said fork feeding movement when the fish crowd in said tunnel in excessive amounts and offer a predetermined resistance against feeding, said actuating means being also adapted to effect a slower fork feeding movement following such stoppage in the event that such excessive resistance continues.

11. In a fish canning machine, the combination of a feeding tunnel having entrance and discharge openings, a carrier for advancing fish into the entrance of said tunnel, a feeding fork for moving fish from said carrier along said tunnel, instrumentalities operating in said tunnel for receiving the fish from said feeding fork and discharging it out of said discharge opening, a rotating turret located adjacent said discharge opening and carrying measuring chambers for receiving the discharged fish as said chambers pass said discharge opening, means for actuating said carrier, feeding fork, instrumentalities and turret as a unit, means for controlling the movement of said carrier and said feeding fork, means near the discharge opening for feeding fish thereto, and means for accelerating said carrier and fork relative to the speed of said turret.

12. In a fish canning machine, the combination of a feeding tunnel having entrance and discharge openings, a carrier for advancing fish into the entrance of said tunnel, a cutter arranged parallel with the tunnel for severing can lengths of fish from the fish so fed, a feeding fork for moving cut fish from said carrier along said tunnel, instrumentalities operating in said tunnel for receiving the fish from said feeding fork and discharging it out of said discharge opening, a rotating turret located adjacent said discharge opening and carrying cans and measuring chambers for receiving the discharged fish, filling plungers associated with said chambers for forcing the fish therefrom and into said cans, means for actuating said carrier, cutter, feeding fork, instrumentalities, turret and plungers as a unit, and independent means for controlling the movement of said carrier, said cutter and said feeding fork.

13. In a fish canning machine, the combination of a feeding tunnel having entrance and discharge openings, a carrier for advancing fish into the entrance of said tunnel, a cutter for severing can lengths of fish from the fish so fed, a feeding fork for moving cut fish from said carrier along said tunnel, instrumentalities operating in said tunnel for receiving the fish from said feeding fork and discharging it out of said discharge opening, a rotating turret located adjacent said discharge opening and carrying cans and measuring chambers for receiving the discharged fish, filling plungers associated with said chambers for forcing the fish therefrom and into said cans, means for actuating said carrier, cutter, feeding fork, instrumentalities, turret and plungers as a unit, means for stopping movement of said carrier, cutter and feeding fork while the other parts continue to operate, and means for then resuming the movement of said feeding fork, said carrier and said cutter at a slower fish feeding rate.

14. In a fish canning machine, the combination of a feeding tunnel, a feeding fork for moving fish along said tunnel, a drive shaft and a driven shaft associated with said feeding fork, a timing unit interposed between said shafts and adapted to provide driving connection for actuating said feeding fork, and means within said timing unit operable by an abnormal resistance of said fish in said tunnel against the feeding operation and effective through said driven shaft for disconnecting the said shafts and stopping the feeding of said fork.

15. In a fish canning machine, the combination of a feeding tunnel, a feeding fork for moving fish along said tunnel, a drive shaft and a driven shaft associated with said feeding fork, a timing unit interposed between said shafts and adapted to provide driving connection for actuating said feeding fork, means within said timing unit operable by an abnormal resistance of said fish in said tunnel against the feeding operation and effective through said driven shaft for disconnecting the said shafts and stopping the feeding of said fork, and means independent of said timing unit for moving said feeding fork at a slower rate of travel following its stoppage by the fish resistance.

16. In a fish canning machine, the combination of a feeding tunnel having a discharge opening at one end, a turret rotatively disposed adjacent said tunnel discharge opening, a plurality of measuring chambers carried by said turret and opening into the periphery thereof, instrumentalities for advancing cut fish through said tunnel and out of said discharge opening and into said measuring chambers, and a vertically reciprocating knife adapted to operate across said tunnel discharge opening to successively sever charges of fish from the remaining fish in said tunnel.

17. In a fish canning machine, the combination of a feeding tunnel having a discharge opening at one end, a turret rotatively disposed adjacent said tunnel discharge opening, a plurality of measuring chambers carried by said turret, instrumentalities for advancing cut fish through said tunnel and out of said discharge opening and into said measuring chambers, a vertically reciprocating knife adapted to operate across said tunnel discharge opening to successively sever charges of fish from the remaining fish in said tunnel, a movable backing-up plate positioned in said tunnel wall and extending directly beneath said knife for supporting the fish at that position, and means for withdrawing said plate as said knife passes through said tunnel in the severing operation.

18. In a fish canning machine, the combination of a feeding tunnel having a discharge opening at one end, a plurality of measuring chambers, instrumentalities for advancing cut fish through said tunnel and out of said discharge opening and into said measuring chamber, a vertically reciprocating knife adapted for operation across said tunnel discharge opening for severing a charge of fish from the remaining fish in said tunnel, a movable backing-up plate located in the bottom of said tunnel and normally extending across an opening in the tunnel wall directly beneath the cutting edge of said knife, means for withdrawing said plate from said opening to permit entrance of the cutting edge of said knife following the severing operation while maintaining spring tension on said plate, and means for relieving part of said spring tension as said knife completes its cutting operation.

19. In a fish canning machine, the combination of a feeding tunnel, a carrier for advancing fish into the entrance end of said tunnel transversely to the same, a cutter adapted to operate transversely of the line of travel of said fish and substantially parallel with the tunnel to sever a predetermined length of fish, a turret rotatably disposed adjacent the discharge end of said tunnel, a plurality of measuring chambers carried by said turret, means for continuously moving each measuring chamber consecutively adjacent said tunnel discharge end, and means for moving said cut fish of predetermined length along said tunnel and out through its discharge end and into a said measuring chamber as it passes adjacent.

20. In a fish canning machine, the combination of a feeding tunnel, a carrier for advancing fish into the entrance end of said tunnel, a cutter adapted to operate transversely of the line of travel of said fish and substantially parallel with the tunnel to sever a predetermined length of fish, a turret rotatably disposed adjacent the discharge end of said tunnel, can support members carried by said turret for holding cans to be filled, a plurality of measuring chambers carried by said turret, a said chamber being associated with each can support, means for continuously moving each measuring chamber consecutively adjacent said tunnel discharge end, means for moving said cut fish of predetermined length along said tunnel and out through its discharge end and into a said measuring chamber as it passes adjacent, and means carried by said turret for forcing the fish from said measuring chamber into one of said cans.

21. In a fish canning machine, the combination of a feeding tunnel having a discharge end, a movable carrier for advancing fish into the entrance end of said tunnel, a cutter adapted for operation transversely of the line of travel of said fish and substantially parallel with the tunnel to cut the fish into predetermined lengths, means for moving the cut fish along said tunnel the while turning it into vertical position for discharge through said tunnel discharge end, and a movable measuring chamber adapted to pass the discharge end of said tunnel and to receive the cut fish as it moves from said tunnel.

22. In a fish canning machine, the combination of a feeding tunnel having a discharge end, a carrier for advancing fish into the entrance end of said tunnel, a cutter adapted for operation transversely of the line of travel of said fish and substantially parallel with the tunnel to cut the fish into predetermined lengths, means for moving the cut fish along said tunnel the while turning it into vertical position for discharge through said tunnel discharge end, a turret rotatably disposed adjacent the discharge end of said tunnel, can support members carried by said turret for holding cans to be filled, a plurality of measuring chambers carried by said turret, a said chamber being associated with each can support and receiving the fish from said tunnel as it passes the discharge opening, and means for filling the fish contained in a said chamber into an associated can on its support.

23. In a fish canning machine, the combination of a feeding tunnel having entrance and discharge openings, a carrier chain introducing fish into said tunnel through its entrance opening, a cutter located adjacent said entrance opening and parallel with the tunnel and adapted to cut the fish into can lengths, measuring chambers which are successively presented to said tunnel discharge opening, instrumentalities for advancing cut fish through said tunnel and into a said measuring chamber by way of said discharge opening, a knife for severing a measured charge of fish from the fish mass in said tunnel, and fluid dispensing means for washing and cleaning said cutter and knife to remove fish residue accumulating in the said operations.

24. In a fish canning machine, the combination of a feeding tunnel having a discharge opening at one end, a turret rotatably disposed adjacent said opening, a plurality of measuring chambers carried by said turret and adapted to pass by said opening, instrumentalities for advancing cut fish through said tunnel and out of said discharge opening and into a said measuring chamber, movable jaw members carried by said turret, each movable jaw forming one end wall of each of said chambers, means for holding a said jaw adjacent the wall of said tunnel while said turret continues to rotate and while the fish is filling into its associated chamber, and a vertically reciprocating knife adapted for movement across said tunnel discharge opening for severing a charge of fish from the remaining fish in said tunnel.

25. In a fish canning machine, the combination of a feeding tunnel having a discharge opening at one end, a turret rotatably disposed adjacent said opening, a plurality of measuring chambers carried by said turret and adapted to be moved successively past said opening, instrumentalities for advancing cut fish through said tunnel and out of said discharge opening and into a said measuring chamber during its passage by said opening, the end walls of each measuring chamber being formed with fixed and movable jaw members, means for holding a said movable jaw member alongside of a wall of said tunnel while its associated fixed jaw member is being brought nearer with the rotation of the turret and while the fish is filling into said chamber, and a vertically reciprocating knife movable across said tunnel discharge opening when said fixed and movable jaw members are closest together for severing a charge of fish from the remaining fish in said tunnel.

26. In a fish packing machine, the combination of a second tunnel from which fish are to be fed to a packing receptacle, means for compacting the fish in said second tunnel, a first tunnel into which fish are to be received for delivery to the second tunnel, means for compacting the fish in said first tunnel, and means for changing the speed of compacting the fish in said first tunnel and leaving the speed of compacting the fish in said second tunnel unchanged.

27. In a fish packing machine, an elongated tunnel, in and through which fish are cut and compacted and delivered to the receptacles to be packed, means cooperating with said tunnel for arranging the fish in slices side by side and compressed together and extending horizontally of the tunnel, said tunnel having a configuration to alter the position of said slices during their movement therethrough, whereby cut-off portions of said fish are packed in cans in a vertical position with their long axes parallel to the axes of the cans.

28. In a fish-packing machine the combination of means for advancing cans to be filled, a tunnel leading to the can-filling station, means for compacting fish in said tunnel operating in time with the supply of the cans, means for introducing fish to said tunnel and means for changing the speed of said introducing means relative to the can-advancing means.

29. A method of packing fish into receptacles, which consists in first feeding and compacting the fish at a rate of speed depending upon the size of the fish, and then further feeding and compacting said fish at a rate of speed depending upon the size and frequency of the delivery of the receptacles to be filled by the fish, whereby a predetermined and uniform volume of fish is packed in each receptacle.

WALTER E. ROONEY.